(12) United States Patent
Hirata et al.

(10) Patent No.: US 8,270,259 B2
(45) Date of Patent: *Sep. 18, 2012

(54) NEAR-FIELD OPTICAL HEAD INCLUDING WAVEGUIDE HAVING POLYHEDRON CORE

(75) Inventors: Masakazu Hirata, Chiba (JP); Manabu Oumi, Chiba (JP); Majung Park, Chiba (JP)

(73) Assignee: Seiko Instruments Inc. (JP)

( * ) Notice: Subject to any disclaimer, the term of this patent is extended or adjusted under 35 U.S.C. 154(b) by 378 days.

This patent is subject to a terminal disclaimer.

(21) Appl. No.: 12/312,613

(22) PCT Filed: Nov. 9, 2007

(86) PCT No.: PCT/JP2007/071745
§ 371 (c)(1),
(2), (4) Date: Aug. 12, 2009

(87) PCT Pub. No.: WO2008/062676
PCT Pub. Date: May 29, 2008

(65) Prior Publication Data
US 2010/0061199 A1    Mar. 11, 2010

(30) Foreign Application Priority Data

Nov. 20, 2006  (JP) ................................ 2006-313201
Feb. 8, 2007   (JP) ................................ 2007-029071

(51) Int. Cl.
*G11B 11/00* (2006.01)
(52) U.S. Cl. ................................. 369/13.33; 369/13.13
(58) Field of Classification Search ............... 369/13.13, 369/13.33, 13.32, 112.09, 112.14, 112.21, 369/112.27; 360/59; 385/129, 31, 88–94; 250/201.3, 201.5

See application file for complete search history.

(56) References Cited

U.S. PATENT DOCUMENTS

| | | | |
|---|---|---|---|
| 8,050,170 B2 * | 11/2011 | Park et al. ................ 369/112.23 |
| 2002/0009262 A1 * | 1/2002 | Kasama et al. ................ 385/36 |
| 2002/0166957 A1 * | 11/2002 | Oumi et al. ................ 250/234 |
| 2010/0046111 A1 * | 2/2010 | Hirata et al. ................ 369/13.13 |
| 2011/0141861 A1 * | 6/2011 | Hirata et al. ................ 369/13.33 |
| 2011/0188356 A1 * | 8/2011 | Hirata et al. ................ 369/13.33 |

FOREIGN PATENT DOCUMENTS

| | | |
|---|---|---|
| JP | 2000 206315 | 7/2000 |
| JP | 2005 004901 | 1/2005 |
| JP | 2006 073105 | 3/2006 |
| WO | 00 28536 | 5/2000 |

\* cited by examiner

*Primary Examiner* — Tan X Dinh
(74) *Attorney, Agent, or Firm* — Adams & Wilks

(57) ABSTRACT

A near field light generating element has a polyhedron core and a clad covering the core so as to contact side surfaces of the core. The polyhedron core has a reflection surface that reflects a luminous flux in a direction different from a direction of introduction of the luminous flux via one end side of the near field light generating element. A luminous flux condensing unit condenses the luminous flux reflected by the reflection surface and propagates the condensed luminous flux to the another end side. A near field light generation unit generates near field light from the propagated condensed luminous flux and emits the near field light to the exterior of the near field light generating element via the another end side. The near field light generation unit has an end surface that is exposed to the exterior on the another end side and has at least one side surface that is shielded by a light-shielding film.

11 Claims, 26 Drawing Sheets

DIRECTION OF ROTATION

NEAR-FIELD OPTICAL HEAD INCLUDING WAVEGUIDE HAVING POLYHEDRON CORE

CROSS-REFERENCE TO RELATED APPLICATIONS

This application is a U.S. national stage application of International Application No. PCT/JP2007/071745 filed Nov. 9, 2007, claiming an earliest priority date of Nov. 20, 2006, and published in a non-English language.

BACKGROUND OF THE INVENTION

1. Technical Field

The present invention relates to a near field light generating element configured to collect an induced luminous flux and generate a near field light from the luminous flux, a near field optical head configured to record various information in a magnetic recording medium at a super-high density utilizing the near field light generated by the near field light generating element, and an information recording and reproducing apparatus having the near field optical head.

2. Background Art

In recent years, the recording density of information in a single recording plane is increased in association with increase in capacity of a hard disk or the like in computer equipment. For example, in order to increase the recording capacity per unit area of a magnetic disc, it is necessary to increase the surface recording density. However, in association with increase in recording density, the recording area per one bit on a recording medium is reduced. When the bit size is reduced, the energy possessed by one bit information becomes close to the heat energy of ambient temperatures, and hence a problem of heat demagnetization such as recorded information is inverted or lost due to heat fluctuations or the like arises.

Although a generally used in-plane recording system is a system to record magnetism so as to cause the direction of magnetization to direct toward the in-plane direction of the recording medium, with this system, the above-described loss of the recorded information or the like due to the heat demagnetization is apt to occur. Therefore, in order to solve such inconveniences, it is in the course of transferring to a perpendicular (vertical) recording system which records magnetizing signals in the direction vertical to the recording medium. This system is a system in which magnetic information is recorded on the basis of a principle to bring a single magnetic pole to the recording medium. According to this system, a recording magnetic field is directed substantially vertical to a recording film. Information recorded in the vertical magnetic field is easy to maintain its energetic stability since an N-pole and an S-pole can hardly generate a loop in the recording film plane. Therefore, this perpendicular recording system is resistive against the heat demagnetization in comparison with the in-plane recording system.

However, the recording medium in recent years is required to have a higher density in response to a need such that recording and reproduction of a larger amount of higher density information or the like is desired. Therefore, the recording medium having a higher coercivity are started to be employed in order to minimize influences between adjacent magnetic domains or the heat fluctuations. Therefore, even with the above-described perpendicular recording system, recording of information in the recording medium becomes difficult.

Therefore, in order to solve this inconvenience, a hybrid magnetic recording system (near field light assisted magnetic recording system) in which the magnetic domain is locally heated by the near field light to lower the coercivity temporarily to allow writing during this period is proposed. This hybrid magnetic recording system is a system utilizing a near field light generated by a mutual action between a minute area and an optical aperture formed on the near field optical head in a size not exceeding the wavelength of the light. In this manner, by utilizing the minute optical aperture exceeding a diffraction limited of the light, that is, the near field optical head having the near field light generating element, handling of optical information in an area not exceeding the wavelength of the light, which has been considered to be limited in the optical system in the related art, is enabled. Therefore, the high-density of a recording bit exceeding the light information recording and reproducing apparatus or the like in the related art is achieved.

The near field light generating element is not limited to the optical minute aperture described above, and may be configured with a projecting portion formed, for example, in manometers. With such the projecting portion, generation of the near field light is achieved in the same manner as the optical minute aperture.

Although various types of writing heads on the basis of the hybrid magnetic recording system described above are provided, as one of those, a near field optical head in which the increase in recording density is achieved by reducing the size of a light spot is known (for example, see JP-A-2004-158067 and JP-A-2005-4901).

This near field optical head mainly includes a main magnetic pole, an return pole (auxiliary magnetic pole), a coil winding having a helical conductive pattern formed in the interior of an insulator, a metal scatterer configured to generate a near field light from an irradiated laser beam, a plane laser light source configured to irradiate the metal scatterer with the laser beam, and a lens configured to focus the irradiated laser beam. These respective components are attached to a side surface of a slider fixed to a distal end of the beam.

The main magnetic pole has a surface opposing the recording medium on one end side, and is connected to the return pole on the other end side. In other words, the main magnetic pole and the return pole constitute a single magnetic poly type vertical head having one magnetic pole (single magnetic pole) arranged in the vertical direction. The coil wining is fixed to the return pole in such a manner that part of it passes between the magnetic pole and the return pole. The magnetic pole, the return pole, and the coil winding as described above constitute an electromagnet as a whole.

The above-described metal scatterer formed of gold or the like is attached to a distal end of the main magnetic pole. The above-described plane laser light source is arranged at a position apart from the metal scatterer and the above-described lens is arranged between the plane laser light source and the metal scatterer.

The respective components as described above are attached in the order of the return pole, the coil winding, the main magnetic pole, the metal scatterer, the lens, and the plane laser light source in sequence from the side of the side surface of the slider.

When utilizing the near field optical head configured in this manner, various information is recorded in the recording medium by applying the recording magnetic field simultaneously with the generation of the near field light.

In other words, the laser beam is applied from the plane laser light source. This laser beam is focused by the lens and is applied on the metal scatterer. Then, since free electrons in the interior of the metal scatterer are uniformly oscillated by the electric field of the laser beam, a plasmon is excited so that the near field light is generated at a distal end portion. Consequently, a magnetic recording layer of the recording medium is locally heated by the near field light, and the coercivity is temporarily lowered.

Also, by supplying a drive current to the conductive pattern of the coil winding simultaneously with the above-described laser beam irradiation, the recording magnetic field is locally applied on the magnetic recording layer of the recording medium close to the main magnetic pole. Accordingly, recording of various information in the magnetic recording layer in a state in which the coercivity is temporarily lowered is achieved. In other words, the recording in the recording medium is achieved in cooperation between the near field light and the magnetic field.

Patent Document 1: JP-A-2004-158067

Patent Document 2: JP-A-2005-4901

However, the near field optical head in the related art as described above still has the following problem.

In other words, when generating the near field light which is inevitable in information recording, the metal scatterer is irradiated with the laser beam from the plane laser light source via the lens. However, since the metal scatterer is attached to the distal end of the main magnetic pole, the laser beam is obliged to be applied obliquely from the plane laser light source. Therefore, the laser beam cannot be entered along the metal scatterer and hence the laser beam is lost on the way by scattering or the like, so that efficient generation of the near field light is difficult. In particular, since the metal scatterer is not able to systematically change the direction of introduced light, it is obliged to irradiate the metal scatterer with the laser beam obliquely to cause the same to enter therein described above.

Also, since the lens is needed to be arranged between the plane laser light source and the metal scatter while considering the interference with the recording medium, the one having a semi-circular shape is used. Therefore, it is difficult to focus the laser beam on the metal scatterer with a high degree of efficiency. This also causes the lowering of the near field light generation efficiency.

SUMMARY OF THE INVENTION

In view of such circumstances, it is an object of the present invention to provide a near field light generating element which is able to focus an introduced luminous flux while changing the orientation and to generate a near field light from the luminous flux with a high degree of efficiency, a near field optical head having the near field light generating element, and an information recording and reproducing apparatus having the near field optical head.

In order to solve the problems as described above, the present invention provides following means.

A near field light generating element according to the present invention is a near field light generating element configured to propagate a luminous flux introduced on one end side while condensing the same on the other end side in a direction different from the direction of introduction, generate a near field light, and emit the same to an outside, including: a polyhedron core having a reflecting surface configured to reflect the introduced luminous flux to a direction different from the direction of introduction; a luminous flux condensing unit formed by drawing (narrowing) in such a manner that a cross-sectional area orthogonal to a longitudinal direction extending from the one end side toward the other end side is gradually reduced for propagating the reflected luminous flux toward the other end side while condensing the same; and a near field light generating unit further drawn from an end portion of the luminous flux condensing unit to the other end side for generating the near field light from the condensed luminous flux and emitting the same from the other end side toward the outside; and a clad (cladding) formed of a material having a lower index of refraction than that of the core and configured to confine the core in the interior thereof by coming into tight contact with a side surface of the core while exposing the other end side of the core to the outside, in which an end surface of the near field light generating unit exposed to the outside on the other end side has a size not exceeding the wavelength of the light, and at least one of side surfaces is light-shielded by a light-shielding film.

In the near field light generating element according to the present invention, the polyhedron core formed integrally by the reflecting surface, the luminous flux condensing unit, and the near field light generating unit and the clad configured to confine the core in the interior thereof, so that the luminous flux introduced into the interior of the core from the one end side may be emitted to the outside from the other end side as the near field light.

The clad is formed so as to come into tight contact with the side surface of the core with the material having a lower index of refraction than that of the core, and confines the core so as not to generate a gap with respect to the core. Here, when the luminous flux is introduced into the interior of the core from the one end side, the luminous flux is reflected on the reflecting surface and is changed in direction. That is, the direction is changed to a direction different from the direction of introduction. Then, the luminous flux changed in direction is propagated in the interior of the core from the one end side to the other end side by the luminous flux condensing unit.

In this case, the luminous flux condensing unit is drawn in such a manner that the cross-sectional area orthogonal to the longitudinal direction extending from the one end side to the other end side is gradually reduced. Therefore, the luminous flux is gradually condensed while repeating the reflection from the side surface when passing through the luminous flux condensing unit, and is propagated in the interior of the core. In particular, since the clad is in tight contact with the side surface of the core, the light does not leak to the outside the core, and the introduced luminous flux is propagated to the other end side while condensing without waste.

Then, the luminous flux propagating to the end portion of the luminous flux condensing unit subsequently enters the near field light generating unit. This near field light generating unit is further drawn toward the other end side, and the end surface exposed to the outside on the other end side has a size not exceeding the wavelength of the light (a minute size exceeding the diffraction limited of the light). In addition, at least one side surface from among the side surfaces of the near field light generating unit is shielded by the light-shielding film. Therefore, the luminous flux entered into the near field light generating unit may be propagated toward the end surface without leaking the same toward the clad. Therefore, the near field light may be generated, and may be emitted from the end surface to the outside.

As described above, the luminous flux introduced from the one end side of the core may be converted into the near field light, and this near field light may be emitted from the other end side to the outside. Also, since the direction of the introduced luminous flux may be changed freely toward the other end side by reflecting the same on the reflecting surface, the luminous flux may be generated as the near field light reliably from the other end side irrespective of the direction of introduction of the luminous flux. In addition, since the luminous flux condensing unit and the near field light generating unit are formed integrally, the positioning of the both such as the lens and the metal scatterer as in the related art is not necessary.

From these reasons, the near field light generating element may be used easily in various devices which require the near field light, so that the design flexibility may be improved. In particular, since the near field light may be generated with a high degree of efficiency irrespective of the direction of introduction of the luminous flux, easy handling and superior convenience are achieved.

The near field light generating element according to the present invention is, in the near field light generating element according to the present invention as described above, characterized in that the clad is formed in a state of exposing one end side of the core to the outside.

In the near field light generating element according to the present invention, since the clad is formed in the state in which the one end side of the core is exposed to the outside, the luminous flux may be introduced directly into the core without the intermediary of the clad, and may be converted into the near field light with a higher degree of efficiency and emitted to the outside from the end surface.

The near field light generating element according to the present invention is, in the near field light generating element according to the present invention as described above, characterized in that the near field light generating unit is formed straight so as to have a predetermined length on the other end side which is the same size as the end surface.

In the near field light generating element according to the present invention, the near field light generating unit is not drown from the end portion of the luminous flux condensing unit to the end surface, but is formed straight so as to have the predetermined length on the other end side which is the same size as the end surface. Therefore, when forming the end surface by dicing the other end sides of the core and the clad in a process of manufacturing the near field light generating element, an always constant size of the end surface is achieved even though a slight dicing error is included or a drawing error is included. Therefore, even though a large amount of the near field light generating elements are manufactured, variations (individual difference) of the respective near field light generating elements may be eliminated and products of the same quality are stably manufactured. Therefore, improvement of yield is achieved.

The near field light generating element according to the present invention is, in any one of the near field light generating elements according to the present invention as described above, characterized in that every side surfaces of the near field light generating unit are light-shielded by the light-shielding film (shading film).

In the near field light generating element according to the present invention, since every side surfaces of the near field light generating unit are light-shielded by the light-shielding film, the luminous flux entered into the near field light generating unit does not leak toward the clad. Therefore, the loss of the luminous flux may be minimized, and hence the near field light may be generated with a higher degree of efficiency.

The near field light generating element according to the present invention is, in the near field light generating element according to the present invention described above, characterized in that the light-shielding film is a metallic film which increases the light intensity of the near field light.

In the near field light generating element according to the present invention, the near field light having a stronger light intensity may be generated. In other words, the luminous flux condensed by the luminous flux condensing unit enters the metallic film in the near field light generating unit. Then, a surface plasmon is excited in the metallic film. The excited surface plasmon is propagated along an interface between the metallic film and the core toward the end surface while being increased in intensity by a resonance effect. Then, when it reaches the end surface, it leaks to the outside as the near field light having a strong light intensity. In particular, since the near field light having the strong light intensity is generated in the interface between the metallic film and the core, direct influence of the design size of the end surface by itself is avoided. In other words, generation of the near field light having the strong light intensity is ensured without being affected by physical designs even when a measure such as miniaturization of the size of the end surface is not taken.

The near field light generating element according to the present invention is, in the near field light generating element in the present invention as described above, characterized in that the side surface of the near field light generating unit provided with the metallic film is adjusted in angle so that the luminous flux condensed by the luminous flux condensing unit enters the metallic film at a resonant angle and the surface plasmon is excited with the energy of the luminous flux.

In the near field light generating element according to the present invention, the luminous flux condensed by the luminous flux condensing unit may be entered into the metallic film at the resonant angle at which the energy of the light is utilized for exciting the surface plasmon to a maximum extent. Therefore, the surface plasmon may be excited with a highest degree of efficiency, and the near field light at a further stronger light intensity may be generated with a higher degree of efficiency. Therefore, recording at the higher density is achieved.

A near field optical head according to the present invention is a near field optical head configured to record information by heating a magnetic recording medium which rotates in a constant direction and causing a magnetization reversal by providing a recording magnetic field in the vertical direction with respect to the magnetic recording medium, including: a slider arranged so as to oppose a surface of the magnetic recording medium; an auxiliary magnetic pole fixed to a distal end surface of the slider; a main magnetic pole connected to the auxiliary magnetic pole via a magnetic circuit and generating the recording magnetic field between itself and the auxiliary magnetic pole; a coil configured to receive a supply of an electric current modulated according to the information and wound around the magnetic circuit in a helical pattern; any one of the near field light generating elements according to the invention fixed adjacently to the main magnetic pole in a state in which the other end side is directed toward the magnetic recording medium; and luminous flux introducing means fixed to the slider in a state of being arranged in parallel to the slider and configured to introduce the luminous flux into the core from the one end side, in which the near field light generating unit generates the near field light in the vicinity of the main magnetic pole.

In the near field optical head according to the present invention, information recording in the rotating magnetic recording medium may be achieved by a near field light assisted magnetic recording system in which the near field light generated by the near field light generating element and the recording magnetic field generated in the both magnetic poles are cooperated.

First of all, the slider is arranged in the state of being opposed to the surface of the magnetic recording medium. Then, the auxiliary magnetic pole is fixed to the distal end surface of the slider and the main magnetic pole is connected to the auxiliary magnetic pole via the magnetic circuit. In addition, the near field light generating element is fixed adjacently to the main magnetic pole. In other words, arranged on the distal end surface of the slider are the auxiliary magnetic pole, the magnetic circuit, the main magnetic pole, and the near field light generating element in sequence from the side of the slider.

The near field light generating element is fixed in the state in which the other end side where the near field light is generated is directed toward the magnetic recording medium side. Therefore, the one end side where the luminous flux is introduced is directed to a position apart from the magnetic recording medium. Then, the luminous flux introducing means fixed to the slider is connected to the one end side.

When recording here, the luminous flux is introduced into the core from the luminous flux introducing means. In this case, the luminous flux may be introduced in the direction parallel to the slider. Then, the direction of the introduced luminous flux is bent substantially by 90 degrees by the reflecting surface, and is propagated toward the other end side positioned on the side of the magnetic recording medium while being condensed by the luminous flux condensing unit. Then, it is converted to the near field light by the near field light generating unit, and leaks to the outside from the end surface. With this near field light, the magnetic recording medium is heated locally, so that the coercivity is temporarily lowered. In particular, since the near field light generating unit generates the near field light in the vicinity of the main magnetic pole, the coercivity of the magnetic recording medium may be lowered at a position as close to the main magnetic pole as possible.

In contrast, simultaneously with the above-described introduction of the luminous flux, the electric current modulated according to the information to be recorded is supplied to the coil. Then, since the current magnetic field generates a magnetic flux in the magnetic circuit on the basis of the principle of the electromagnet, the recording magnetic field in the vertical direction with respect to the magnetic recording medium may be generated between the main magnetic pole and the auxiliary magnetic pole. More specifically, the magnetic flux generated from the main magnetic pole flows vertically with respect to the magnetic recording medium, and returns back to the auxiliary magnetic pole after having passed through the magnetic recording medium. Accordingly, the recording magnetic field may be caused to act on a pinpoint local position of the magnetic recording medium where the coercivity is lowered by the near field light. The direction of this recording magnetic field is inverted according to the information to be recorded.

Then, the direction of magnetization of the magnetic recording medium is inverted to the vertical direction according to the direction of the recording magnetic field upon reception of the recording magnetic field. Consequently, the recording the information is achieved. In other words, the information recording is achieved by the near field light assisted magnetic recording system in which the near field light and the recording magnetic field are cooperated. Since the recording is performed by a vertical magnetic recording system, a stable recording with a high writing reliability is achieved without being affected by the phenomenon of the heat fluctuations.

In particular, since the coercivity of the magnetic recording medium may be lowered in the vicinity of the main magnetic pole, a peak position of the heating temperature may be set to a position where the recording magnetic field locally acts. Therefore, the recording is achieved further reliably, and the high density recording is enabled.

Since the near field light generating element which is able to generate the near field light with a high degree of efficiency is provided, the writing reliability of the near field optical head by itself may be enhanced and improvement of the quality is achieved. Also, since the near field light generating element generates the luminous flux from the other end side as the near field light irrespective of the direction of introduction of the luminous flux as well, the luminous flux from the luminous flux introducing means may be converted into the near field light in the vicinity of the main magnetic pole even when the luminous flux introducing means is arranged in parallel to the slider. In this manner, since the luminous flux introducing means may be arranged without being affected by the direction of introduction of the luminous flux, the design of the near field optical head may be downsized. In addition, since the luminous flux does not have to be propagated in air in contrast to the method of introducing the light in the related art, a optical waveguide loss may be minimized.

In addition, since the auxiliary magnetic pole, the main magnetic pole, and the near field light generating element and so on are arranged in sequence on the distal end surface of the slider, the possibility of overlapping of the respective components other than the luminous flux introducing means in the direction of thickness of the slider is minimized. Therefore, reduction of the thickness of the near field optical head by itself may be achieved.

The near field optical head according to the present invention is, in the near field optical head according to the present invention as described above, characterized in that the clad is formed with a groove portion which exposes a side surface of the near field light generating unit, and the main magnetic pole includes a projecting portion which comes into contact with the side surface of the near field light generating unit via the groove portion.

In the near field optical head according to the present invention, since the main magnetic pole includes the projecting portion which comes into contact with the side surface of the near field light generating unit via the groove portion formed on the clad, the position where the near field light is generated and the position where the recording magnetic field is generated may be brought to be as close as possible. Therefore, the near field light and the recording magnetic field may be brought into cooperation with a high degree of efficiency, so that the high density recording is supported.

Also, the near field optical head according to the present invention is, in the near field optical head according to the present invention as described above, characterized in that the light-shielding film is formed between the projecting portion and the side surface of the near field light generating unit.

In the near field optical head according to the present invention, since the light-shielding film is formed between the projecting portion and the side surface of the near field light generating unit, the near field light may be generated in the vicinity of the projecting portion further intensively. Therefore, recording at the higher density is achieved.

The near field optical head according to the present invention is, in the near field optical head according to the present invention as described above, characterized in that a shield film configured to shield at least one of an electric connection or a magnetic connection between the projecting portion and the light-shielding film is formed therebetween.

In the near field optical head according to the present invention, the information recording is achieved by the near field light assisted magnetic recording system in which the near field light and the recording magnetic field are cooperated further effectively.

An information recording and reproducing apparatus according to the present invention includes: any one of near field optical heads according to the present invention as described above; a beam configured to be movable in a direction parallel to a surface of the magnetic recording medium and support the near field optical head at a distal end side in a state of being rotatable about two axes extending in parallel to the surface of the magnetic recording medium and being orthogonal to each other; a light source configured to enter the luminous flux to the luminous flux introducing means; an actuator configured to support a proximal end side of the beam and move the beam toward the direction parallel to the surface of the magnetic recording medium; a rotation driving unit configured to rotate the magnetic recording medium in the constant direction; and a control unit configured to supply the electric current to the coil and control an operation of the light source.

In the information recording and reproducing apparatus according to the present invention, the magnetic recording medium is rotated in the constant direction by the rotation driving unit, and then the beam is moved by the actuator to cause the near field optical head to scan. Then, the near field optical head is arranged at a desired position on the magnetic recording medium. In this case, the near field optical head is supported by the beam in the state of being rotatable about the two axes extending in parallel to the surface of the magnetic recording medium, that is, so as to be twisted about the two axes. Therefore, even when a wave is generated in the movement of the magnetic recording medium, a change in wind pressure caused by such wave or a change of the wave which is directly transmitted may be absorbed by the twisting, so that the posture of the near field optical head may be stabilized.

Therefore, the control unit activates the light source, and supplies the electric current modulated according to the information to the coil. Accordingly, the near field optical head causes the near field light and the recording magnetic field to cooperate with each other so that the recording the information in the magnetic recording medium is achieved.

In particular, since the near field optical head as described above is provided, the writing reliability is high, and the high density recording is supported, whereby the high quality is achieved. Simultaneously, reduction of the thickness is also achieved.

DETAILED DESCRIPTION OF THE PREFERRED EMBODIMENT

Referring now to FIG. 1 to FIG. 8, an embodiment of a near field light generating element, a near field optical head and an information recording and reproducing apparatus according to the present invention will be described. An information recording and reproducing apparatus 1 in this embodiment is an apparatus configured to write in a vertical recording system in a disc (magnetic recording medium) D having a vertical recording layer d2. In this embodiment, an air floating (flying) type in which a near field optical head 2 is floated utilizing a flow of air generated by the rotation of the disc D will be exemplified for description.

Figure 1:
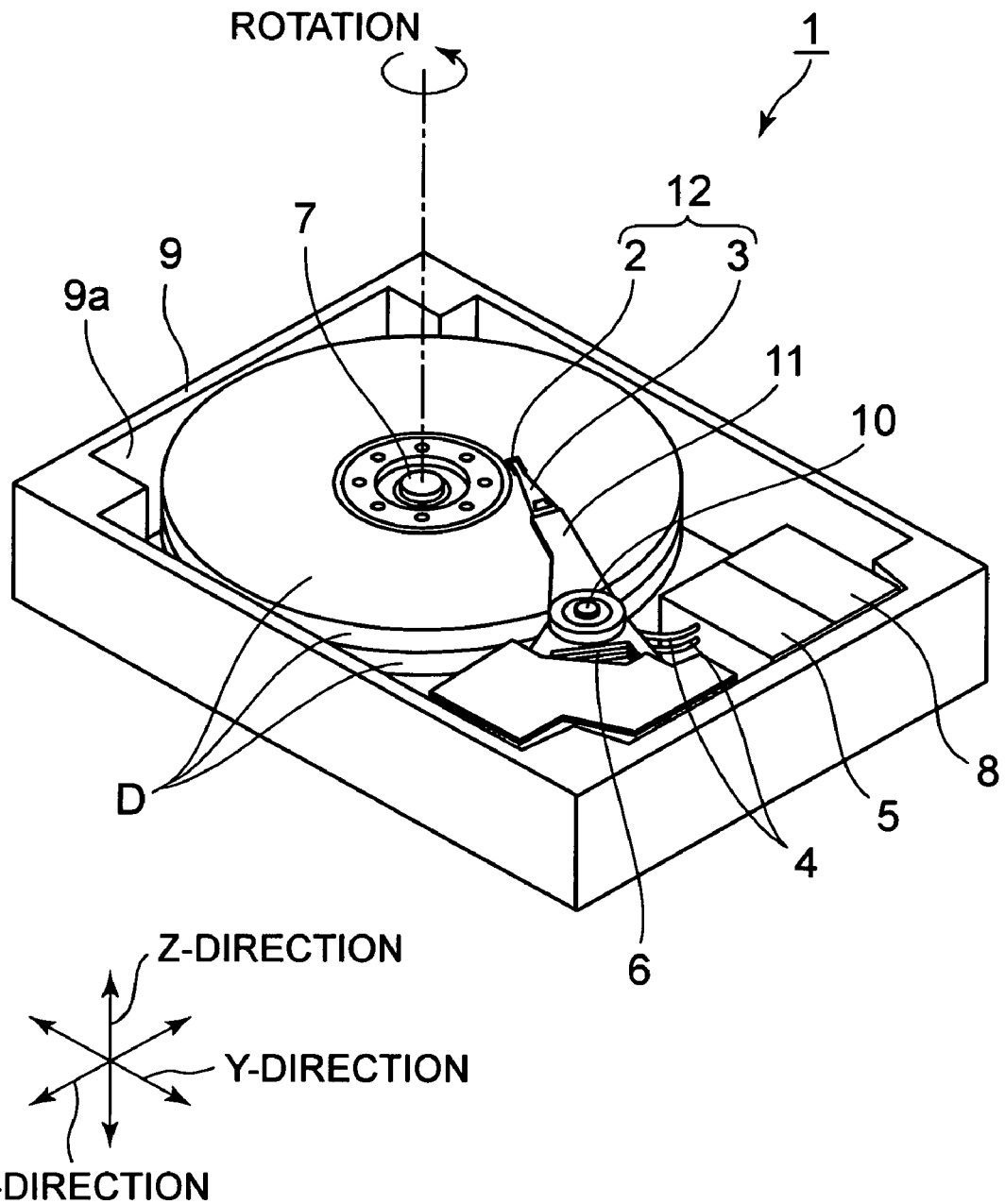
FIG. 1 is a configuration drawing showing an embodiment of an information recording and reproducing apparatus provided with a near field optical head having a near field light generating element according to the present invention.

The information recording and reproducing apparatus 1 in this embodiment includes, as shown in FIG. 1, the near field optical head 2 having a spot size converter (near field light generating element) 22, described later, a beam 3 configured to be movable in a XY-direction which is parallel to a disc surface (surface of the magnetic recording medium) D1 and to support the near field optical head 2 at a distal end side in a state of rotatable about two axes (X-axis and Y-axis) extending in parallel with the disc surface D1 and being orthogonal two each other, an optical signal controller (light source) 5 configured to allow a luminous flux L to enter from a proximal end side of a optical waveguide (luminous flux introducing means) 4 into the optical waveguide 4, an actuator 6 configured to support a proximal end side of the beam 3 and move the beam 3 in the XY-direction extending in parallel to the disc surface D1 for scanning, a spindle motor (rotary driving unit) 7 configured to rotate the disc D in a constant direction, a control unit 8 configured to supply an electric current modulated according to information to coils 33, described later, and control an operation of the optical signal controller 5, and a housing 9 configured to store these components respectively in the interior thereof.

The housing 9 is formed of a metallic material such as aluminum into a square prism shape in top view, and is formed with a recessed portion 9a for storing respective components in the inside thereof. The housing 9 is configured in such a manner that a lid, not shown, is detachably fixed so as to close an aperture of the recessed portion 9a.

The above-described spindle motor 7 is attached to a substantially center of the recessed portion 9a, and the disc D is detachably fixed by fitting a center hole on the spindle motor 7. The above-described actuator 6 is attached to a corner portion of the recessed portion 9a. A carriage 11 is mounted to the actuator 6 via a bearing 10, and the beam 3 is attached to a distal end of the carriage 11. Then, the carriage and the beam 3 are movable in the above-described XY-direction together by an activation of the actuator 6.

The carriage 11 and the beam 3 are configured to retract from above the disc D by the activation of the actuator 6 when the rotation of the disc D is stopped. Also, the near field optical head 2 and the beam 3 constitute a suspension 12. The optical signal controller 5 is mounted in the recessed portion 9a adjacently to the actuator 6. The above-described control unit 8 is mounted adjacently to the actuator 6.

Figure 2:
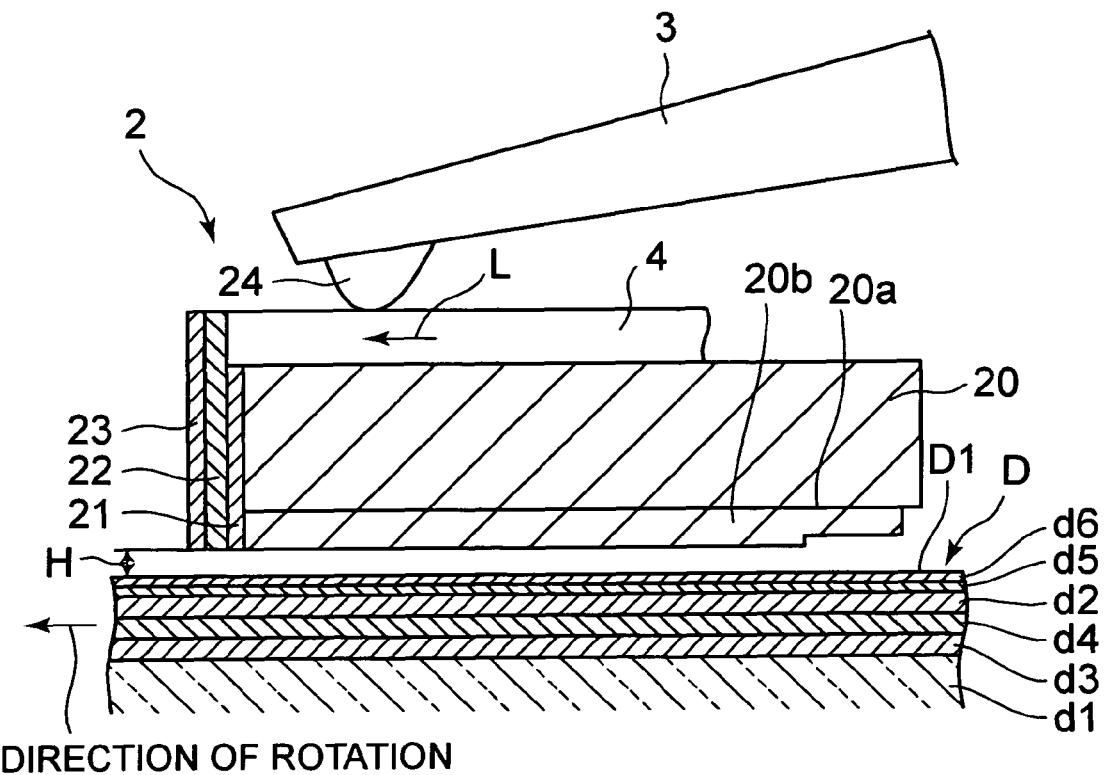
FIG. 2 is an enlarged cross-sectional view of the near field optical head shown in FIG. 1.
Figure 2:
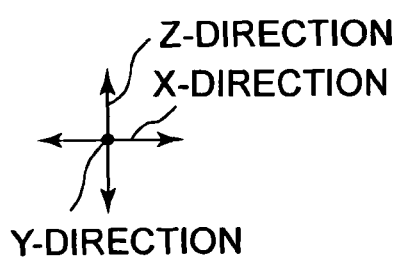
Figure 3:
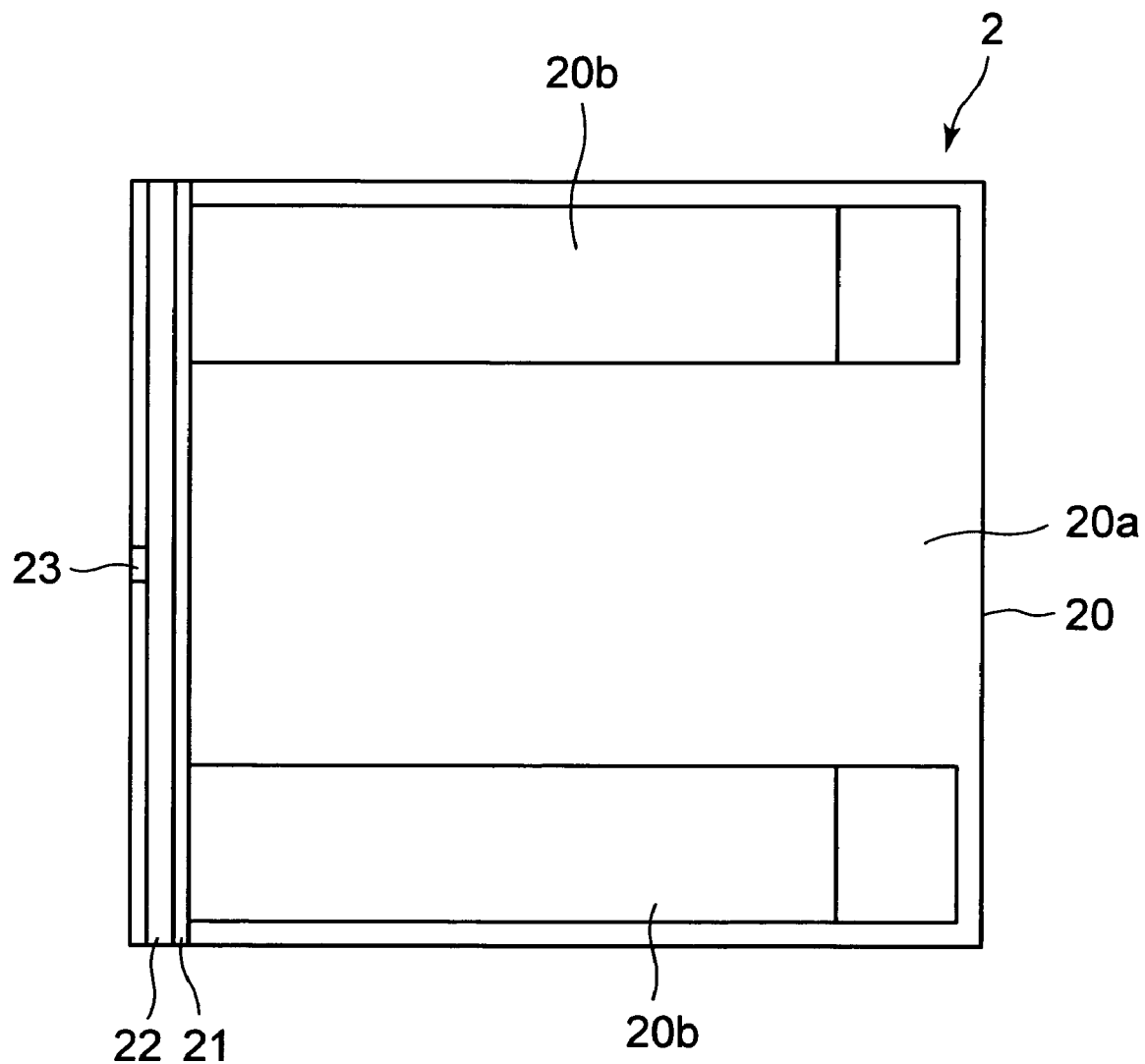
FIG. 3 is a drawing showing the near field optical head shown in FIG. 2 viewed from the side of a disc surface.

The above-described near field optical head 2 is configured to record information by heating the rotating disc D, and generating a flux reversal by providing the disk D with a vertical recording magnetic field. The near field optical head 2 includes, as shown in FIG. 2 and FIG. 3, a slider 20 being arranged so as to oppose the disc D in a state of being floated from a disc surface D1 by a predetermined distance H and having an opposed surface 20a opposing the disc surface D1, a recording element 21 fixed to a distal end surface of the slider 20 (hereinafter, referred to as a side surface on the side of an outflow end), the spot size converter 22 fixed adjacently to the recording element 21, and the optical waveguide 4 configured to introduce the luminous flux L from the optical signal controller 5 into a core 40, described later, of the spot size converter 22. The near field optical head 2 in this embodiment is provided with a reproducing element 23 fixed adjacently to the spot size converter 22.

The above-described slider 20 is formed of light-transmitting materials such as quartz glass or ceramic or the like such as AlTiC (altic) into a parallelepiped shape. This slider 20 is supported so as to be suspended from a distal end of the beam 3 via a gimbal unit 24 with the opposed surface 20a faced toward the disc D. The gimbal unit 24 is a member limited in movement so as to be displaced only about the X-axis and about the Y-axis. Accordingly, the slider 20 is rotatable about the two axes (X-axis, Y-axis) extending in parallel to the disc surface D1 and being orthogonal to each other as described above.

The opposed surface 20a of the slider 20 is formed with projecting ridge portions 20b for causing a pressure for floating from the viscosity of an airflow generated by the rotating disc D. In this embodiment, a case in which two of the projecting ridge portions 20b extending in the longitudinal direction arranged like rails is exemplified. However, the invention is not limited to such a case, and any concavo-convex shapes are applicable as long as it is designed to float the slider 20 in an optimal state by adjusting a positive pressure to cause the slider 20 to move away from the disc surface D1 and a negative pressure to cause the slider 20 to be attracted toward the disc surface D1. Surfaces of the projecting ridge portions 20b are surfaces referred to as ABS (Air Bearing Surface).

The slider 20 receives a force to float from the disc surface D1 by these two projecting ridge portions 20b. The beam 3 is configured to deflect in a Z-direction vertical to the disc surface D1 so as to absorb a floating force of the slider 20. In other words, the slider 20 receives a force to be pressed against the side of the disc surface D1 by the beam 3 when floated. Therefore, the slider 20 is adapted to float in a state of being apart from the disc surface D1 by the predetermined distance H as described above by a balance of the both forces. In addition, the slider 20 is configured to rotate about the X-axis and the Y-axis by the gimbal unit 24, and hence is adapted to float constantly in a stable posture.

The airflow generated in association with the rotation of the disc D flows from the side of an inflow end of the slider 20 (the proximal end side of the beam 3), flows along the ABS, and flows out from the side of the outflow end of the slider 20 (the distal end side of the beam 3).

Figure 4:
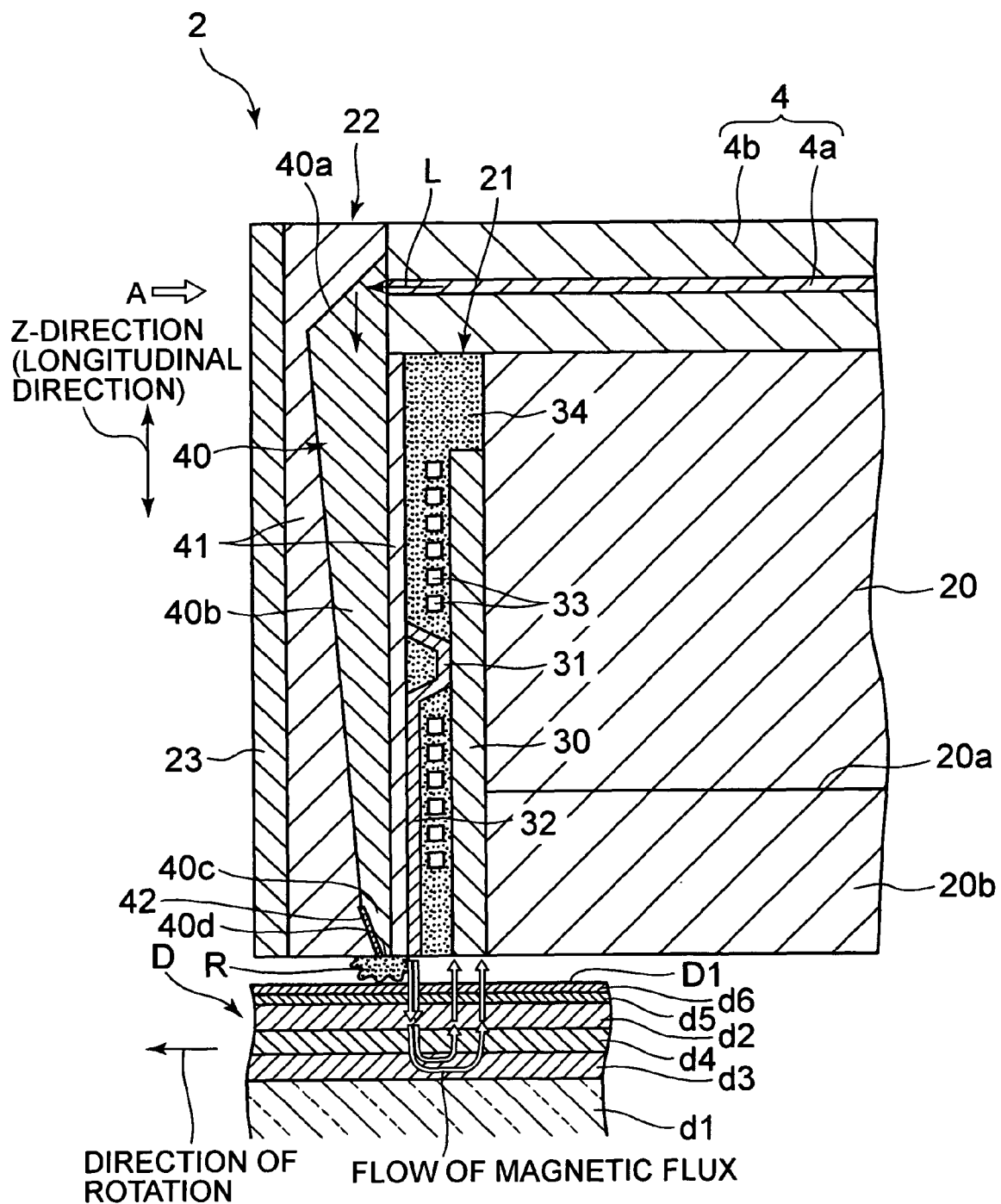
FIG. 4 is an enlarged cross-sectional view of a side surface of the near field optical head shown in FIG. 2 on the side of an outflow end, showing configurations of the near field light generating element and a recording element, and the relation between a near field light and the magnetic field when recording is being performed.

The above-described recording element 21 includes, as shown in FIG. 4, an auxiliary magnetic pole 30 fixed to the side surface on the side of the outflow end of the slider 20, a main magnetic pole 32 connected to the auxiliary magnetic pole 30 via the magnetic circuit 31 and configured to generate the recording magnetic field vertical to the disc D between itself and the auxiliary magnetic pole 30, and the coils 33 wound around the magnetic circuit 31 about a magnetic circuit 31 in a helical pattern. In other words, the auxiliary magnetic pole 30, the magnetic circuit 31, the coil 33, and the main magnetic pole 32 are arranged in sequence from the side of the outflow end of the slider 20.

The both magnetic poles 30, 32 and the magnetic circuit 31 are formed of a high magnetic flux density and high-saturation magnetic flux density (Bs) material (for example, CoNiFe alloy, CoFe alloy, and so on). The coil 33 is arranged so as to have a gap between adjacent coil wires, between themselves and the magnetic circuit 31, and between the both magnetic poles 30, 32 so as to avoid a short circuit, and are molded in this state by an insulator 34. Then, the coils 33 are configured to receive a supply of the electric current modulated according to the information from the control unit 8. In other words, the magnetic circuit 31 and the coils 33 constitute an electromagnetic as a whole. The main magnetic pole 32 and the auxiliary magnetic pole 30 are designed in such a manner that end surfaces thereof opposing the disc D are flush with the ABS of the slider 20.

Figure 5:
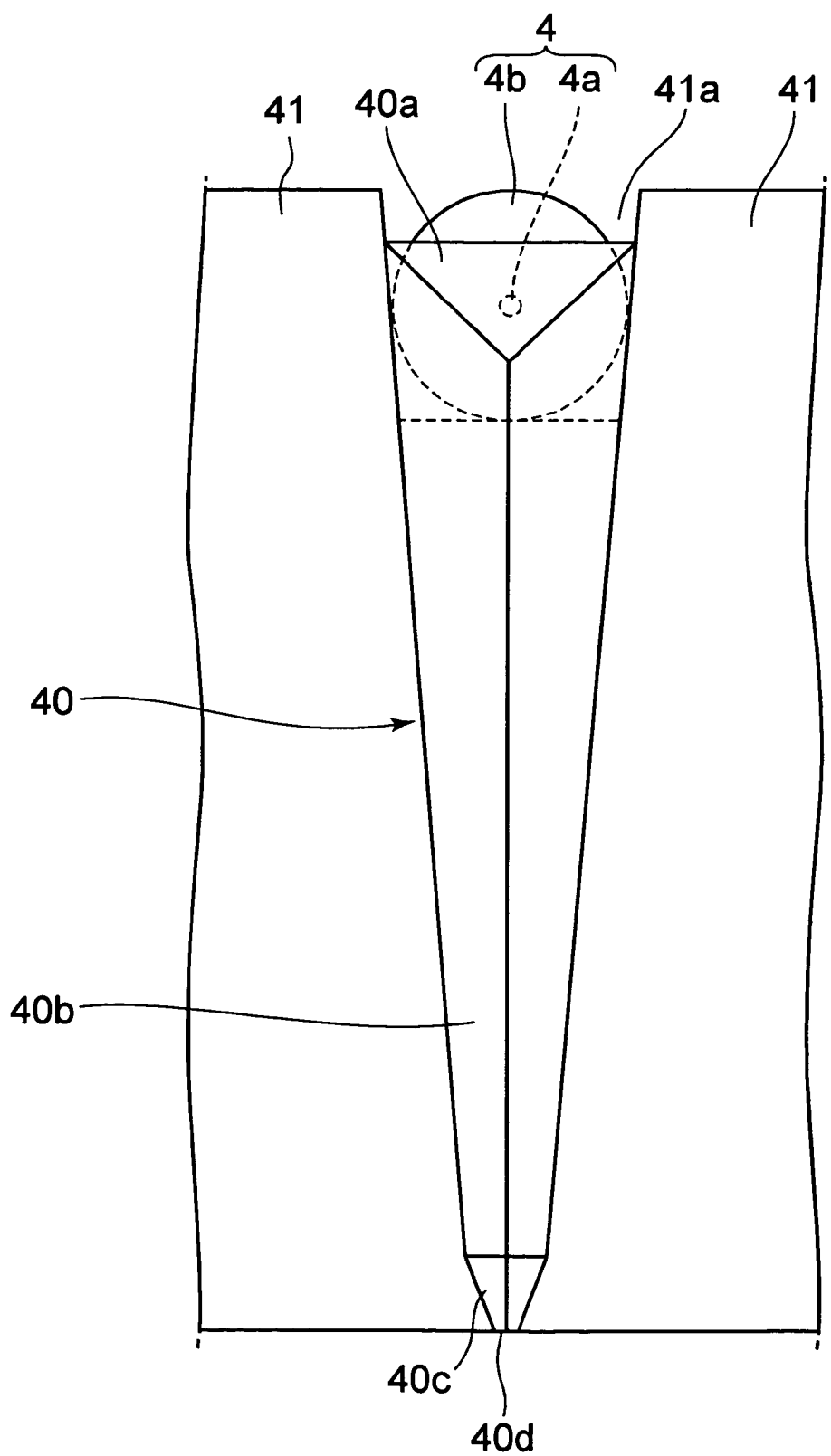
FIG. 5 is a drawing of a core of the near field light generating element shown in FIG. 4 viewed from a direction indicated by an arrow A.

As shown in FIG. 4 and FIG. 5, the above-described spot size converter 22 is fixed adjacently to the recording element 21 in a state of being directed in such a manner that one end side thereof faces upward of the slider 20, and the other end side faces toward the side of the disc D. More specifically, it is fixed adjacently to the main magnetic pole 32. FIG. 5 is a drawing of the core 40, described later, viewed in the direction of an arrow A shown in FIG. 4.

This spot size converter 22 is an element configured to propagate the luminous flux L introduced toward one end side while condensing the same to the other end side in a direction different from the direction of introduction, generate a near field light R and then emit the same to an outside and, as shown in FIG. 4 to FIG. 8, includes the polyhedron core 40 and a clad 41 for confining the core 40 in the interior thereof, and is formed into a substantially plate-shape as a whole.

Figure 6:
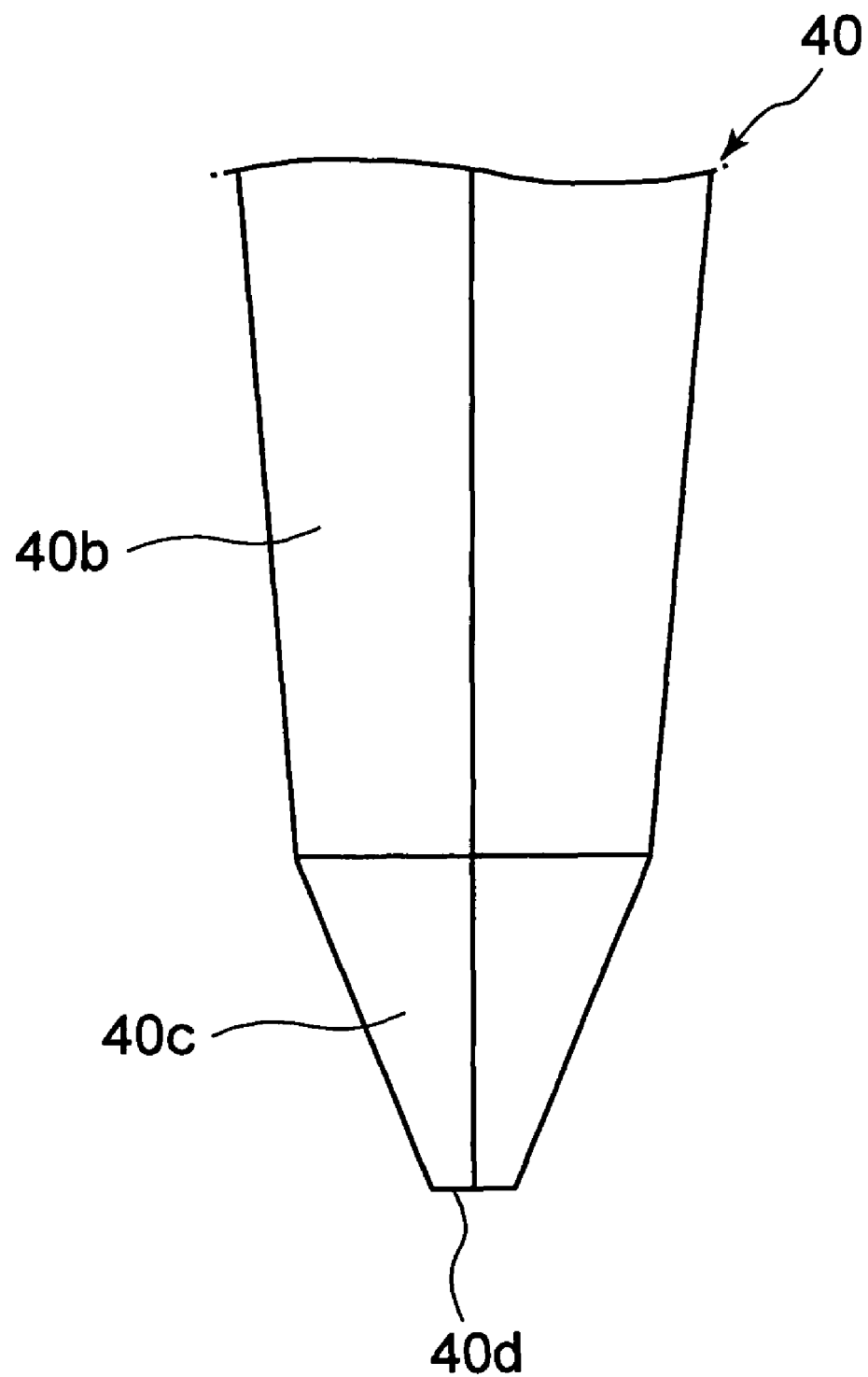
FIG. 6 is an enlarged view of the core shown in FIG. 5 on the other end side.
Figure 7:
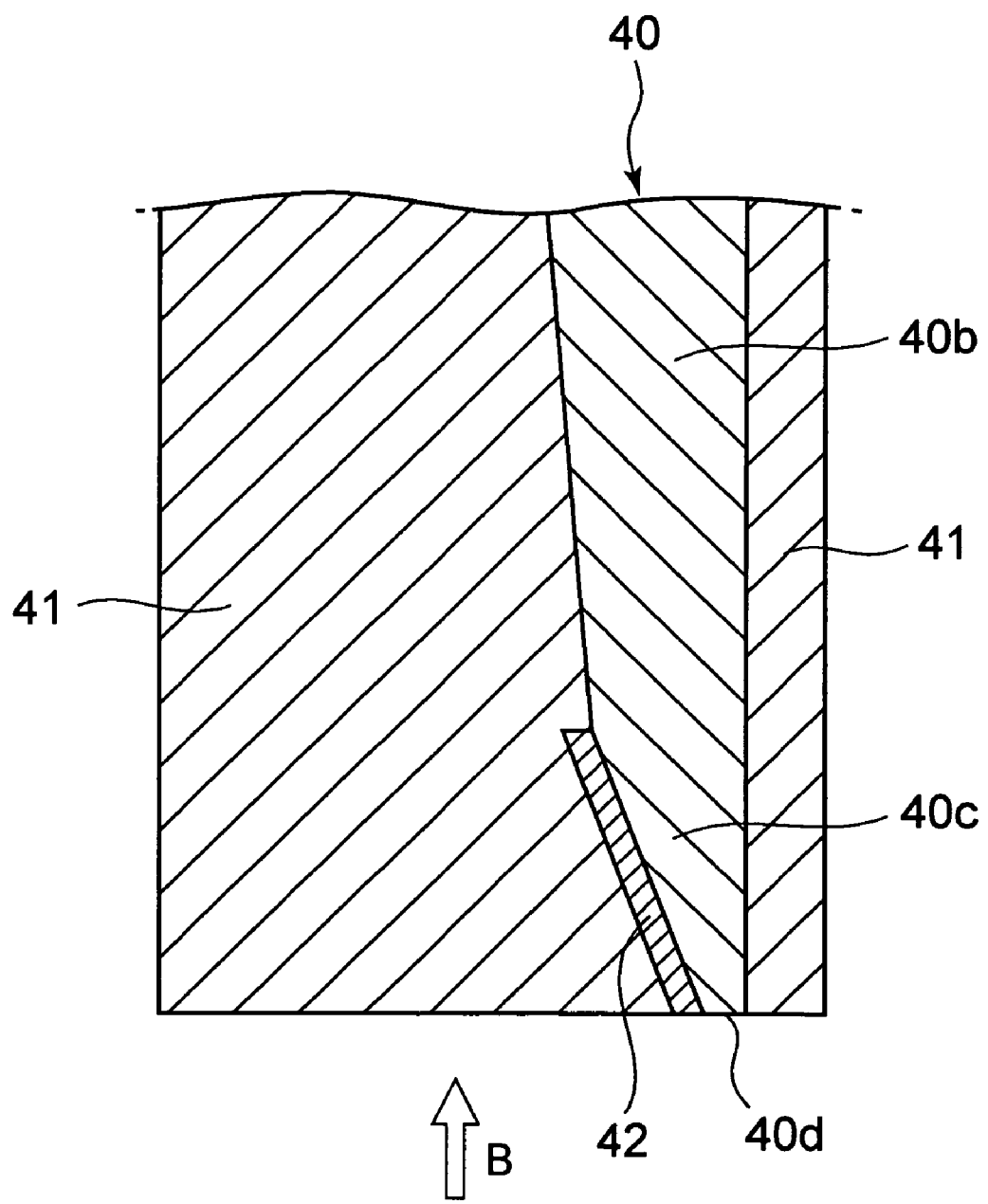
FIG. 7 is an enlarged drawing of the other end side of the near field light generating element shown in FIG. 4.
Figure 8:
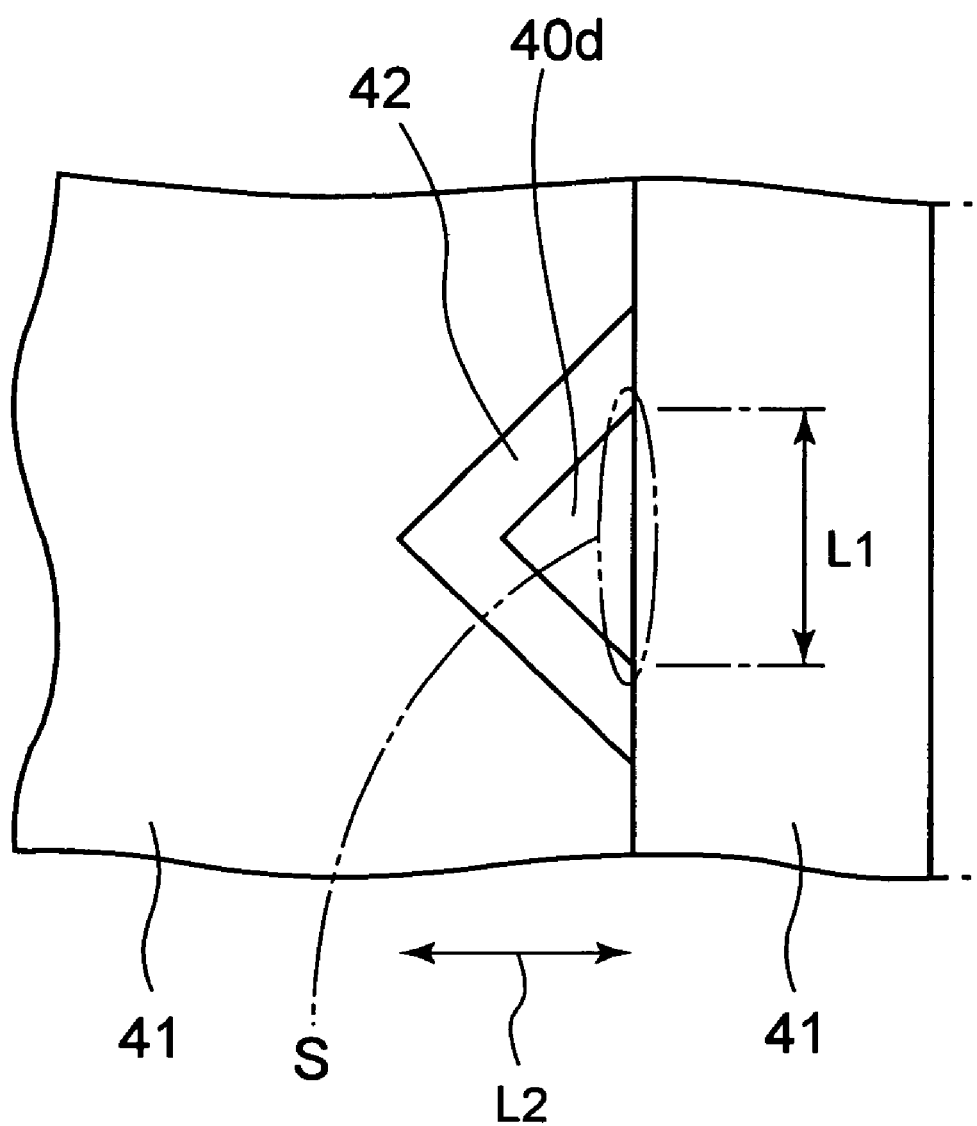
FIG. 8 is a drawing of the near field light generating element shown in FIG. 7 viewed from the side of an end surface.

FIG. 6 is an enlarged view showing the other end side of the core 40 shown in FIG. 5, FIG. 7 is an enlarged view of the other end side of the spot size converter 22 shown in FIG. 4, and FIG. 8 is a drawing of the spot size converter 22 shown in FIG. 7 viewed from the side of an end surface 40d.

The above-described core 40 is formed integrally of a reflecting surface 40a, a luminous flux condensing unit 40b, and a near field light generating unit 40c. In this embodiment, the luminous flux condensing unit 40b and the near field light generating unit 40c are each included three side surfaces, and one of the side surfaces is arranged so as to oppose the main magnetic pole 32.

The reflecting surface 40a reflects the luminous flux L introduced by the optical waveguide 4 from the one end side in a direction different from the direction of introduction. In this embodiment, the luminous flux L is reflected so as to change in direction by substantially 90 degrees. The luminous flux condensing unit 40b is a portion drawn (narrow molded) in such a manner that a cross-sectional area orthogonal to a longitudinal direction (Z-direction) extending from one end side to the other end side is gradually reduced, and propagates the luminous flux L reflected by the reflecting surface 40a to the other end side while condensing the same. In other words, the luminous flux condensing unit 40b is configured to reduce a spot size of the introduced luminous flux L to a small size.

The near field light generating unit 40c is a portion further drawn (narrow-molded) from an end portion of the luminous flux condensing unit 40b toward the other end side. In other words, the near field light generating unit 40c is configured to be able to further reduce the spot size which is reduced by the luminous flux condensing unit 40b. In this case, the near field light generating unit 40c is drawn in such a manner that the end surface 40d positioned on the other end side has a size not exceeding the wavelength of the light. In other words, it is designed in such a manner that a maximum linear length L1 which is secured on the end surface 40d does not exceed the wavelength of the light. The size not exceeding the wavelength of the light is preferably set to a range from 1 nm to 1 μm, and more preferably a range from 1 nm to 500 nm.

Accordingly, the spot size may be reduced to about the same size as the maximum linear length L1, that is, the diameter may be reduced from about 1 nm to 1 μm (or approximately from 1 nm to 500 nm), and the luminous flux L may be emitted from the end surface 40d to the outside as the near field light R of this size.

In this embodiment, the luminous flux condensing unit 40b and the near field light generating unit 40c are both gradually drawn toward the side of the main magnetic pole 32 as shown in FIG. 4. Accordingly, the end surface 40d is positioned on the side of the main magnetic pole 32. Accordingly, the near field light R of the above-described size may be generated in the vicinity of the main magnetic pole 32. The "in the vicinity" in the present invention means an area in a range apart from the main magnetic pole 32 by approximately the same distance as the diameter of the near field light R generated from the end surface 40d or a distance not exceeding this value. Therefore, in the case of this embodiment, the distance between the main magnetic pole 32 and the end surface 40d of the near field light generating unit 40c is designed to be approximately from 1 nm to 1 μm (or approximately from 1 nm to 500 nm), which is approximately the same as the diameter of the near field light R (the maximum linear length L1), or a distance not exceeding this value.

As shown in FIG. 4 and FIG. 5, the above-described clad 41 is formed of a material having a lower index of refraction than that of the core 40, and comes into tight contact with the side surface of the core 40 to confine the core 40 in the interior thereof. Therefore, it is designed so as not to generate a gap between the core 40 and the clad 41. Also, the clad 41 in this embodiment is formed so as to be able to expose the end surface 40d on the other end side to the outside in the same manner as the one end side of the core 40.

An example of a combination of materials used as the clad 41 and the core 40 will be given. For example, a combination such that the core 40 is formed of quartz ($SiO_2$), and the clad 41 is formed of quartz doped with fluorine is contemplated. In this case, when the wavelength of the luminous flux L is 400 nm, the index of refraction of the core 40 is 1.47, and the index of refraction of the clad 41 is smaller than 1.47, so that it is a preferable combination. Also, a combination such that the core 40 is formed of quartz doped with germanium and the clad 41 is formed of quartz ($SiO_2$) is also contemplated. In this case, when the wavelength of the luminous flux L is 400 nm, the index of refraction of the core 40 is larger than 1.47, and the index of refraction of the clad 41 is 1.47, so that it is a preferable combination.

In particular, the larger the difference in index of refraction between the core 40 and the clad 41 is, the larger the force to confine the luminous flux L in the core 40 becomes, so that the difference in index of refraction of the both is preferably increased by using tantalum oxide ($Ta_2O_5$; when the wavelength is 550 nm, the index of refraction is 2.16) for the core 40, and using quartz or the like for the clad 41. Also, when utilizing the luminous flux L in an infrared area, it is also effective to form the core 40 of silicon (Si: the index of refraction is about 4) as a transparent material for the infrared light.

Also, on two surfaces of the three side surfaces of the near field light generating unit 40c except for the one surface opposing the main magnetic pole 32, light-shielding films 42 for shielding the luminous flux L are formed. Accordingly, it is configured to prevent the luminous flux L from leaking out from the near field light generating unit 40c toward the clad 41. The near field light generating unit 40c is configured to generate the near field light R from the luminous flux L condensed by the luminous flux condensing unit 40b to emit the same to the outside from the end surface 40d by the light-shielding films 42 and the drawing error described above. In addition, since the end surface 40d is formed on the side of the main magnetic pole 32, generation of the near field light R in the vicinity of the main magnetic pole 32 is achieved. The end surface 40d of the spot size converter 22 is designed to be flush with the ABS of the slider 20.

As shown in FIG. 4 and FIG. 5, the above-described optical waveguide 4 is a biaxial light guide including a core 4a and a clad 4b, and is configured to allow the luminous flux L to propagate within the core 4a. The optical waveguide 4 is fixed in a state of being fitted into a groove portion 41a formed in the clad 41 and a groove portion, not shown, formed on an upper surface of the slider 20. Accordingly, the optical waveguide 4 is in a state of being arranged in parallel to the slider 20.

A distal end of the optical waveguide 4 is connected to the one end side of the spot size converter 22, and introduces the luminous flux L into the core 40. The proximal side of the optical waveguide 4 is pulled by the optical signal controller 5 via the beam 3, the carriage 11, or the like and then is connected to the optical signal controller 5.

As shown in FIG. 5, the positional relation between the spot size converter 22 and the optical waveguide 4 is adjusted so that the luminous flux L introduced from the optical waveguide 4 into the core 40 enters a substantially center of the reflecting surface 40a.

The above-described reproducing element 23 is a magnetoresistive effect film configured to change in electric resistance according to the magnitude of a magnetic field leaked from the vertical recording layer d2 of the disc D. A bias current is supplied to the reproducing element 23 from the control unit 8 via a lead film or the like, not shown. Accordingly, the control unit 8 is able to detect the change of the magnetic field leaked from the disc D as the change of the voltage, so that reproduction of the signal may be performed from the change of the voltage.

The disc D used in this embodiment is a vertical two-layer film disc including at least the vertical recording layer d2 having an easy axis of magnetization in a direction vertical to the disc surface D1, and a soft magnetic layer d3 formed of a high magnetic-permeability material. As the disc D as described above, as shown in FIG. 2 for example, the one including the soft magnetic layer d3, an intermediate layer d4, the vertical recording layer d2, a protective layer d5, and a lubricant layer d6 in sequence formed on a base plate d1 is used.

The base plate d1 is, for example, an aluminum substrate, a glass substrate, or the like. The soft magnetic layer d3 is a high magnetic-permeable layer. The intermediate layer d4 is a crystal control layer of the vertical recording layer d2. The vertical recording layer d2 corresponds to a vertical anisotropic magnetic layer and, for example, a CoCrPt based alloy is used. The protective layer d5 is configured to protect the vertical recording layer d2 and, for example, a DLC (diamond like carbon) film is used. For example, a fluorine-based liquid lubrication is used as the lubricant layer d6.

Subsequently, a case of recording and reproducing the various information in and from the disk D by the information recording and reproducing apparatus 1 configured as described above will be described.

First of all, the spindle motor 7 is activated to rotate the disc D in the constant direction. Subsequently, the actuator 6 is activated to cause the beam 3 to scan in the XY-direction via the carriage 11. Accordingly, as shown in FIG. 1, the near field optical head 2 may be positioned at a desired position on the disc D. In this case, the near field optical head 2 receives a force to float by the two projecting ridge portions 20b formed on the opposed surface 20a of the slider 20 and is pressed toward the disk D by the beam 3 or the like with a predetermined force. The near field optical head 2 floats to a position apart from the surface of the disc D by the predetermined distance H as shown in FIG. 2 by a balance of the both forces.

Even though the near field optical head 2 receives a wind pressure generated by a wave of the movement of the disc D, the displacement in the Z-direction thereof is absorbed by the beam 3, and the displacement about the XY-axes is enabled by the gimbal unit 24, the wing pressure caused by the wave may be absorbed. Therefore, the near field optical head 2 may be floated in a stable state.

When recording the information here, the control unit 8 activates the optical signal controller 5 and supplies an electric current modulated according to the information to the coils 33.

First of all, the optical signal controller 5 causes the luminous flux L to enter from the proximal end side of the optical waveguide 4 upon reception of an instruction from the control unit 8. The entered luminous flux L proceeds in the core 4a of the optical waveguide 4 to a distal end side and, as shown in FIG. 4, is introduced into the core 40 from the one end side of the spot size converter 22. In this case, the luminous flux L is introduced into the core 40 in the direction parallel to the slider 20. Then, the introduced luminous flux L is reflected on the reflecting surface 40a, and is changed in direction by approximately 90 degrees. That is, the direction is changed to a direction different from the direction of introduction. Then, the luminous flux L changed in direction is propagated toward the other end side positioned on the side of the disk D while being condensed by the luminous flux condensing unit 40b, and enters the near field light generating unit 40c.

In this case, the luminous flux condensing unit 40b is drawn in such a manner that the cross-sectional area orthogonal to the longitudinal direction extending from the one end side to the other end side is gradually reduced. Therefore, the luminous flux L is gradually condensed while repeating the reflection from the side surface when passing through the luminous flux condensing unit 40b, and is propagated in the interior of the core 40. In particular, since the clad 41 is in tight contact with the side surface of the core 40, the light is not leaked to the outside the core 40, and the introduced luminous flux L is propagated to the other end side while condensing without waste.

Then, the luminous flux L propagating to the end portion of the luminous flux condensing unit 40b subsequently enters the near field light generating unit 40c. This near field light generating unit 40c is further drawn toward the other end side, and the end surface 40d has a size not exceeding the wavelength of the light. In addition, two side surfaces of the near field light generating unit 40c are shielded by the light-shielding films 42. Therefore, the luminous flux L entered into the near field light generating unit 40c may be propagated toward the end surface 40d without leaking the same toward the clad

41. Therefore, the near field light R may be generated, and the near field light R may be emitted from the end surface 40*d* to the outside.

With this near field light R, the disc D is heated locally, so that a coercivity is temporarily lowered. In particular, since the near field light generating unit 40*c* generates the near field light R in the vicinity of the main magnetic pole 32, that is, within a range apart from the main magnetic pole 32 by approximately the same distance as the diameter of the near field light R, the coercivity of the disc D may be lowered at a position as close to the main magnetic pole 32 as possible.

In contrast, when an electric current is supplied to the coil 33 by the control unit 8, the current magnetic field generates a magnetic field in the magnetic circuit 31 on the basis of the principle of the electromagnet, and hence the recording magnetic field in the vertical direction with respect to the disc D may be generated between the main magnetic pole 32 and the auxiliary magnetic pole 30. Then, the magnetic flux generated from the side of the main magnetic pole 32 passes straight through the vertical recording layer d2 of the disc D and reaches the soft magnetic layer d3 as shown in FIG. 4. Accordingly, recording in a state in which magnetization of the vertical recording layer d2 is directed vertically with respect to the disc surface D1 is achieved. Also, the magnetic flux after having reached the soft magnetic layer d3 returns to the auxiliary magnetic pole 30 via the soft magnetic layer d3. In this case, when returning to the auxiliary magnetic pole 30, the direction of the magnetization is not affected. This is because the surface area of the auxiliary magnetic pole 30 opposing the disc surface D1 is larger than the main magnetic pole 32 and hence the density of the magnetic flux is high, so that a force as strong as inverting the magnetization is not generated. In other words, the recording is achieved only on the side of the main magnetic pole 32.

Consequently, the information recording is achieved by the near field light assisted magnetic recording system in which the near field light R and the recording magnetic field generated at the both magnetic poles 30, 32 are cooperated. In addition, since the recording is performed by the vertical recording system, a stable recording is achieved without being affected by the phenomenon of the heat fluctuations. Therefore, improvement of writing reliability is achieved.

In particular, since the coercivity of the disc D may be lowered in the vicinity of the main magnetic pole 32, a peak position of the heating temperature may be set to a position where the recording magnetic field is locally acts. Therefore, the recording is achieved reliably, improvement of the reliability is achieved, and the high density recording is enabled.

Subsequently, when reproducing the information recorded in the disc D, the reproducing element 23 fixed adjacently to the spot size converter 22 receives the magnetic field leaked from the vertical recording layer d2 of the disc D, and the electric resistance is changed according to the magnitude thereof. Therefore, the voltage of the reproducing element 23 is changed. Accordingly, the control unit 8 is able to detect the change of the magnetic field leaked from the disc D as the change of the voltage. Then, the control unit 8 reproduces the signal from the change of the voltage, so that the reproduction of the information is achieved.

As described above, since the near field optical head 2 in this embodiment is provided with the spot size converter 22 which is able to generate the near field light R with a high degree of efficiency, the writing reliability of the near field optical head 2 by itself may be enhanced and improvement of the quality is achieved. In addition, in this embodiment, since the clad 41 is formed in the state in which the one end side and the end surface 40*d* on the other end side of the core 40 is exposed to the outside, the luminous flux L may be introduced directly into the core 40 without the intermediary of the clad 41, and may be converted into the near field light R with a higher degree of efficiency and emitted to the outside from the end surface 40*d*.

In particular, since the spot size converter 22 is able to change the direction of the introduced luminous flux L freely by reflecting the same on the reflecting surface 40*a*, even when the optical waveguide 4 is arranged in parallel to the slider 20, the luminous flux L from the optical waveguide 4 may be converted into the near field light R in the vicinity of the main magnetic pole 32. Therefore, the optical waveguide 4 may be arranged without being affected by the direction of introduction of the luminous flux L. Therefore, the design of the near field optical head 2 may be downsized. In addition, since the luminous flux L does not have to be propagated in air in contrast to the method of introducing the light in the related art, a optical waveguide loss may be minimized. In addition, since the recording element 21, the spot size converter 22, and the reproducing element 23 are arranged in sequence on the side surface on the side of the outflow end of the slider 20, the possibility of overlapping of the respective components other than the optical waveguide 4 in the direction of thickness of the slider 20 is prevented. Therefore, reduction of the thickness of the near field optical head 2 by itself may be achieved.

When manufacturing the near field optical head 2 in this embodiment, manufacturing is achieved by utilizing semiconductor technologies such as photolithographic technology or etching processing technology. In other words, even when the spot size converter 22 is provided, the spot size converter 22 may be manufactured simultaneously in the manufacturing process in the related art without taking a specific methodology.

More specifically, after having machined the slider 20 into a predetermined contour shape, the recording element 21 is fabricated on the side surface on the side of the outflow end of the slider 20 utilizing the above-described semiconductor technology. Then, the spot size converter 22 is fabricated on the recording element 21 utilizing the semiconductor technology in the same manner. What should be done finally is to fabricate the reproducing element 23 on the spot size converter 22. In this manner, the near field optical head 2 may be manufactured easily only by adding one process of manufacturing the spot size converter 22 in the process of fabricating the respective components in sequence from the side of the slider 20.

When manufacturing the spot size converter 22, first of all, the clad 41 is formed on the main magnetic pole 32. In this case, in order to connect the optical waveguide 4 to the one end side thereof later, the clad 41 is patterned to form the groove portion 41*a*. Subsequently, after having formed the core 40 on the clad 41 in a protruding shape, the etching is performed as needed to form the reflecting surface 40*a*, the luminous flux condensing unit 40*b* and the near field light generating unit 40*c*, respectively. Subsequently, the light-shielding film 42 is formed on the side surface of the near field light generating unit 40*c*. Then, the clad 41 is formed again to confine the core 40 in the interior thereof. Then, finally, the contour shape of the clad 41 is machined to achieve a predetermined shape. In this case, the end surface 40*d* may be formed by cutting the other end side of the spot size converter 22 by dicing or the like. In this manner, the spot size converter 22 may be manufactured easily by utilizing the semiconductor technology.

According to the information recording and reproducing apparatus 1 in this embodiment, since the near field optical head 2 as described above is provided, the writing reliability is high, and the high density recording is supported, whereby the high quality is achieved. Simultaneously, reduction of the thickness is also achieved.

In the embodiment described above, it is preferable to introduce the luminous flux L into the optical waveguide 4 after having adjusted the luminous flux L so that a polarized component thereof is directed in the direction indicated by an arrow L2 shown in FIG. 8. Accordingly, intensive localization of the near field light R near the side surface of the near field light generating unit 40c facing toward the main magnetic pole 32 (an area S in FIG. 8) is achieved. Therefore, the recording at the higher density is achieved.

The technical scope of the present invention is not limited to the embodiments described above, and various modifications may be made without departing from the scope of the present invention.

For example, although the case where the spot size converter 22 is applied to the near field optical head 2 is exemplified in the embodiment described above, it is not limited to the near field optical head 2, and may be applied to various devices which need the near field light R. In particular, although the embodiment described above is designed in such a manner that the introduced luminous flux L is changed in direction by substantially 90 degrees by the reflecting surface 40a when applying to the near field optical head 2, the angle of reflection is not limited to this angle. In other words, the luminous flux L introduced from the one end side may be reflected on the reflecting surface 40a and changed in direction by free angles toward the other end side depending on the design of the reflecting surface 40a. Therefore, the luminous flux L may be generated reliably as the near field light R from the other end side irrespective of the direction of introduction of the luminous flux L. Therefore, it is easy to handle and may be utilized in various devices.

Figure 9:
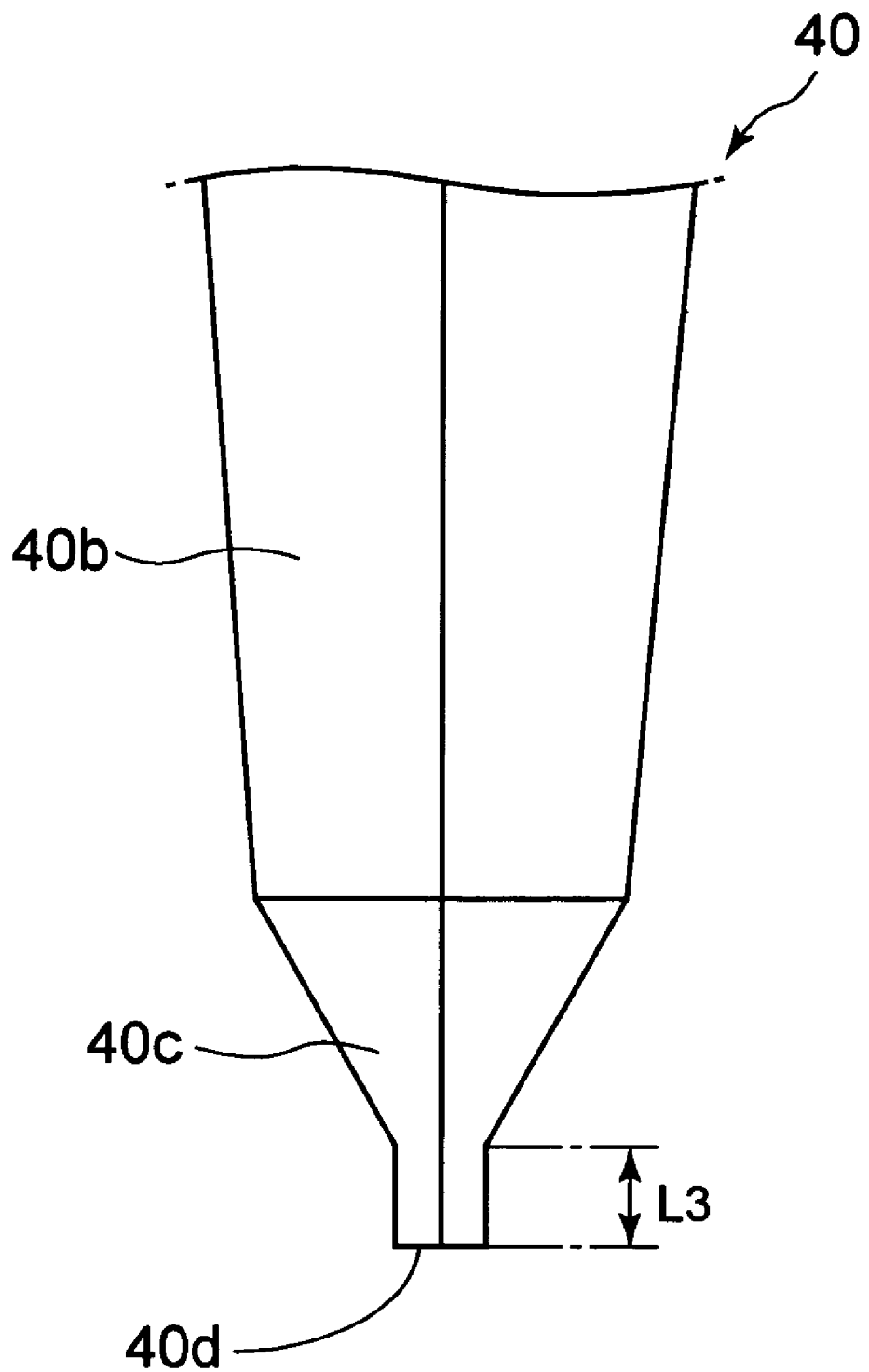
FIG. 9 is a drawing of a modification of the near field light generating element according to the present invention, showing a core in which part of a near field light generating unit is formed straight.
Figure 10:
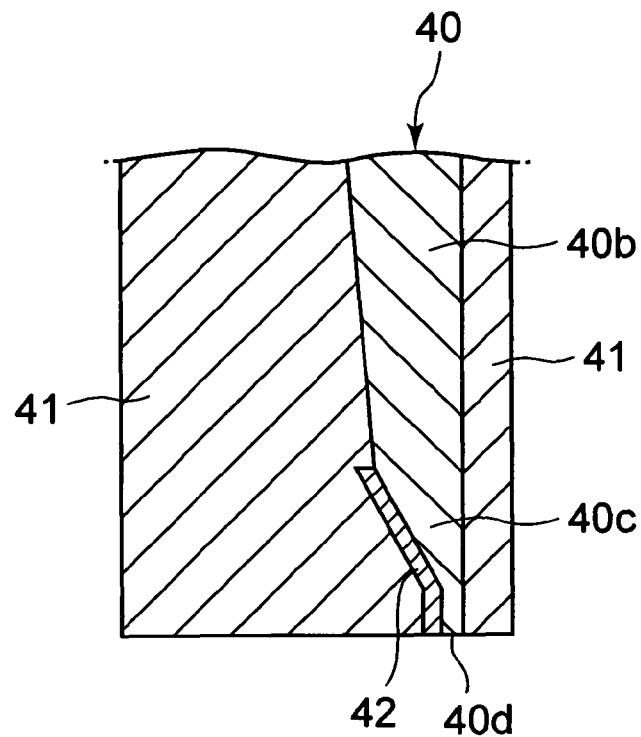
FIG. 10 is a cross-sectional view of the near field light generating element having the core shown in FIG. 9.
Figure 11:
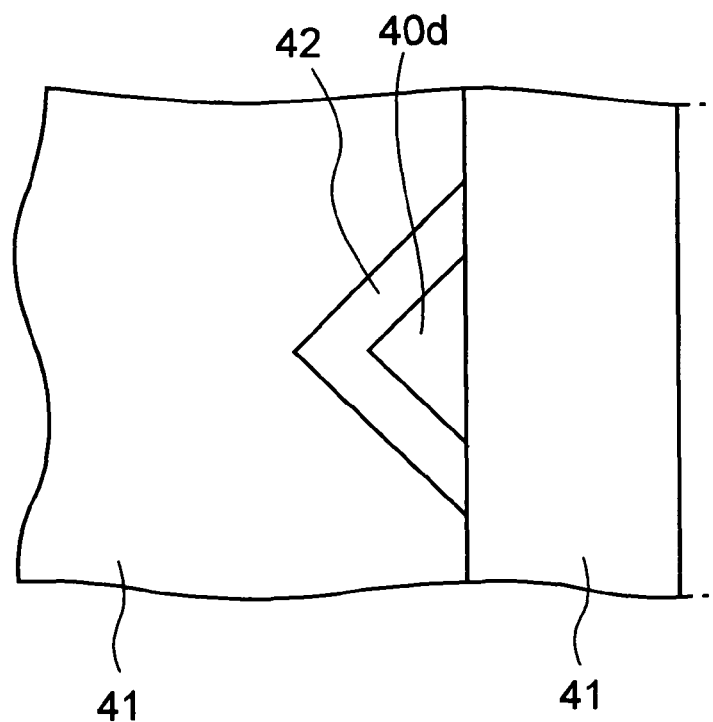
FIG. 11 is a drawing of the near field light generating element shown in FIG. 10 viewed from the side of the end surface.

Also, in the embodiment described above, the near field light generating unit 40c may be formed straight so as to have a predetermined length L3 on the other end side on the other end side having the same size as the end surface 40d as shown from FIG. 9 to FIG. 11. In other words, the near field light generating unit 40c is not drawn from the end portion of the luminous flux condensing unit 40b to the end surface 40d, but the predetermined length L3 on the other end side on the other end side is formed straight.

Therefore, when forming the end surface 40d by dicing the other end sides of the core 40 and the clad 41 in a process of manufacturing the spot size converter 22, an always constant size of the end surface 40d is achieved even though a slight dicing error is included or a drawing error is included. Therefore, even though a large amount of the spot size converters 22 are manufactured, variations (individual difference) of the respective spot size converters 22 may be eliminated and products of the same quality are stably manufactured. Therefore, improvement of yield is achieved.

Although only the two surfaces of the three surfaces of the near field light generating unit 40c are light-shielded by the light-shielding films 42 in the embodiment described above, it is also possible to light-shield at least only one side surface. In this case as well, the near field light R may be generated.

Figure 12:
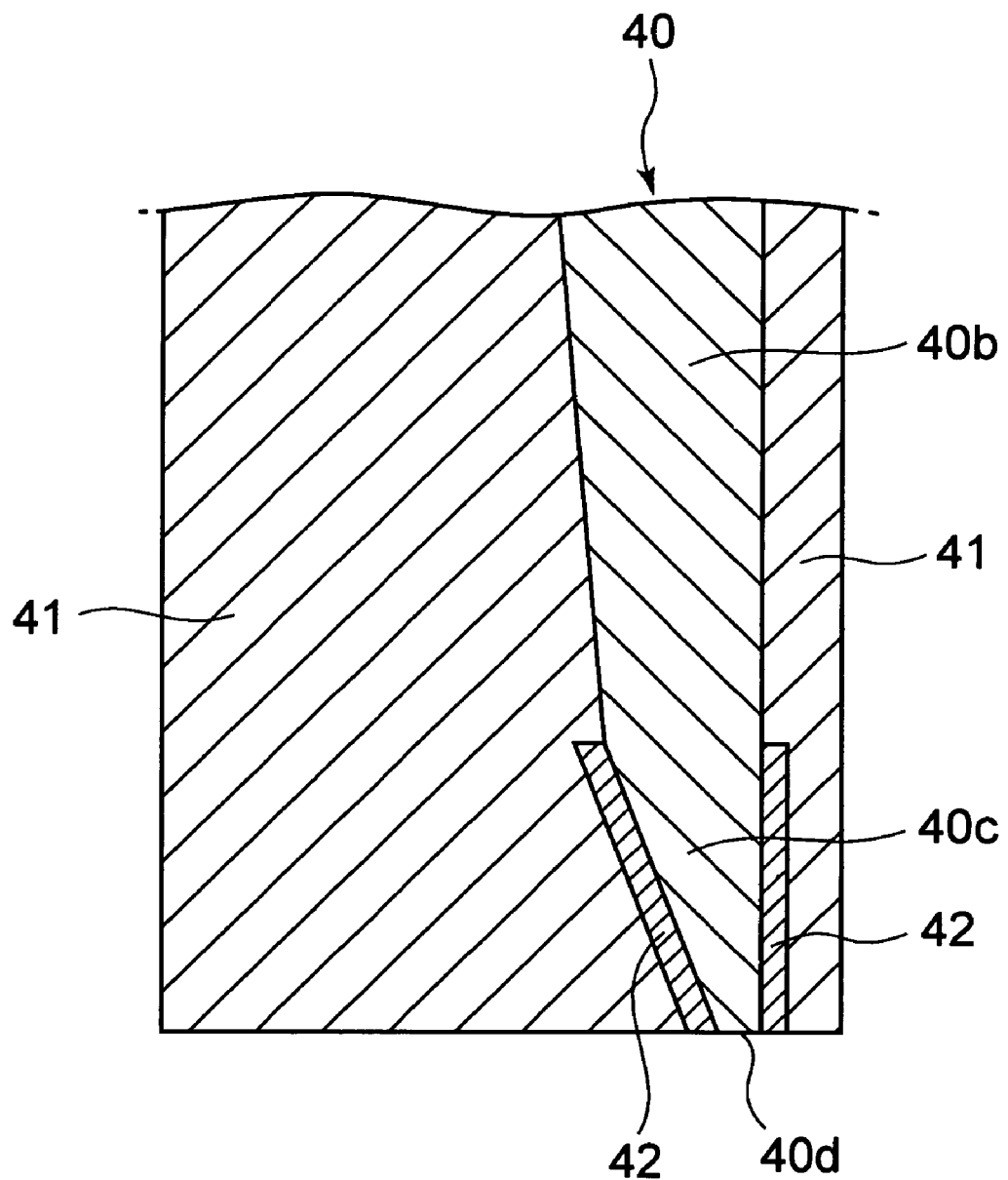
FIG. 12 is a drawing of a modification of the near field light generating element according to the present invention, and is a cross-sectional view showing the near field light generating element in which a light-shielding film is formed on every side surfaces of the near field light generating unit.
Figure 13:
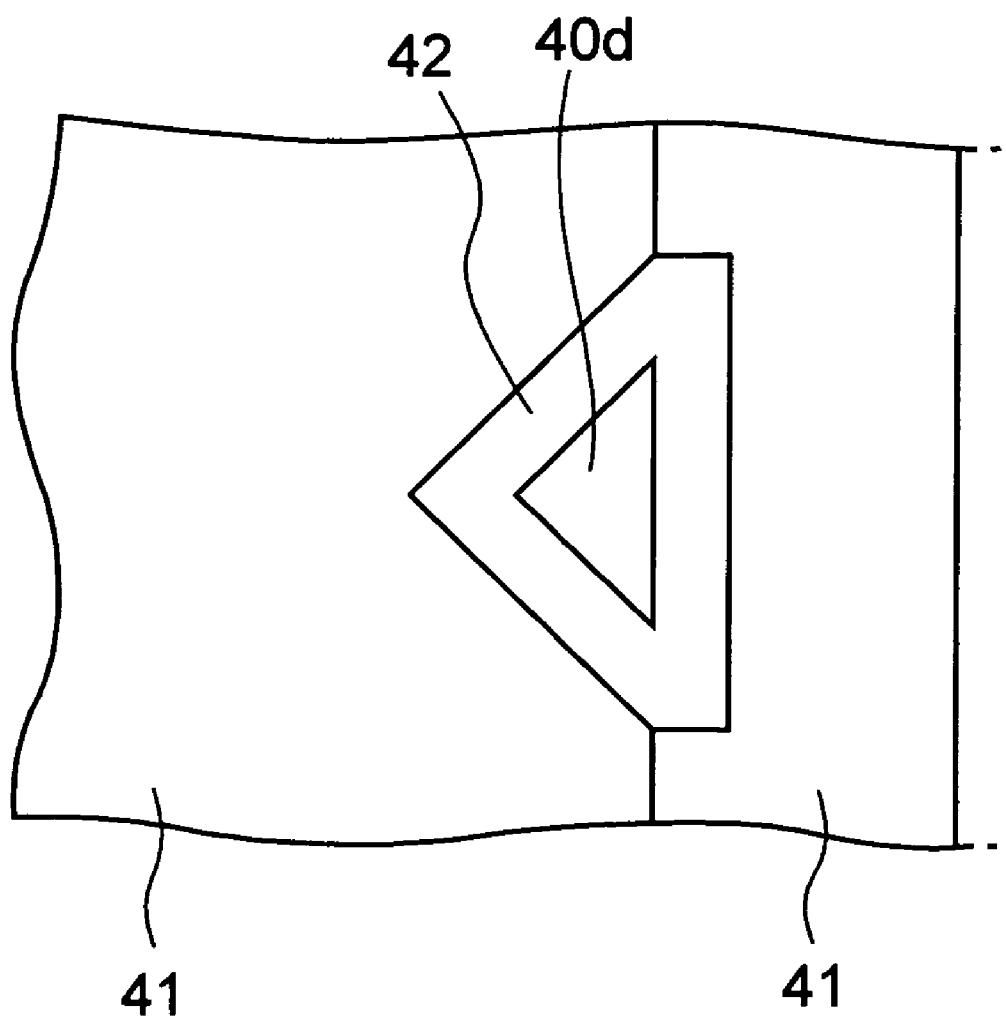
FIG. 13 is a drawing of the near field light generating element shown in FIG. 12 viewed from the side of the end surface.

However, as shown in FIG. 12 and FIG. 13, it is preferable to light-shielded every side surfaces (three side surfaces) with the light-shielding films 42. In this configuration, the luminous flux L entered into the near field light generating unit 40c is not leaked toward the clad 41. Therefore, the loss of the luminous flux L may be minimized, and hence the near field light R may be generated with a higher degree of efficiency.

Figure 14:
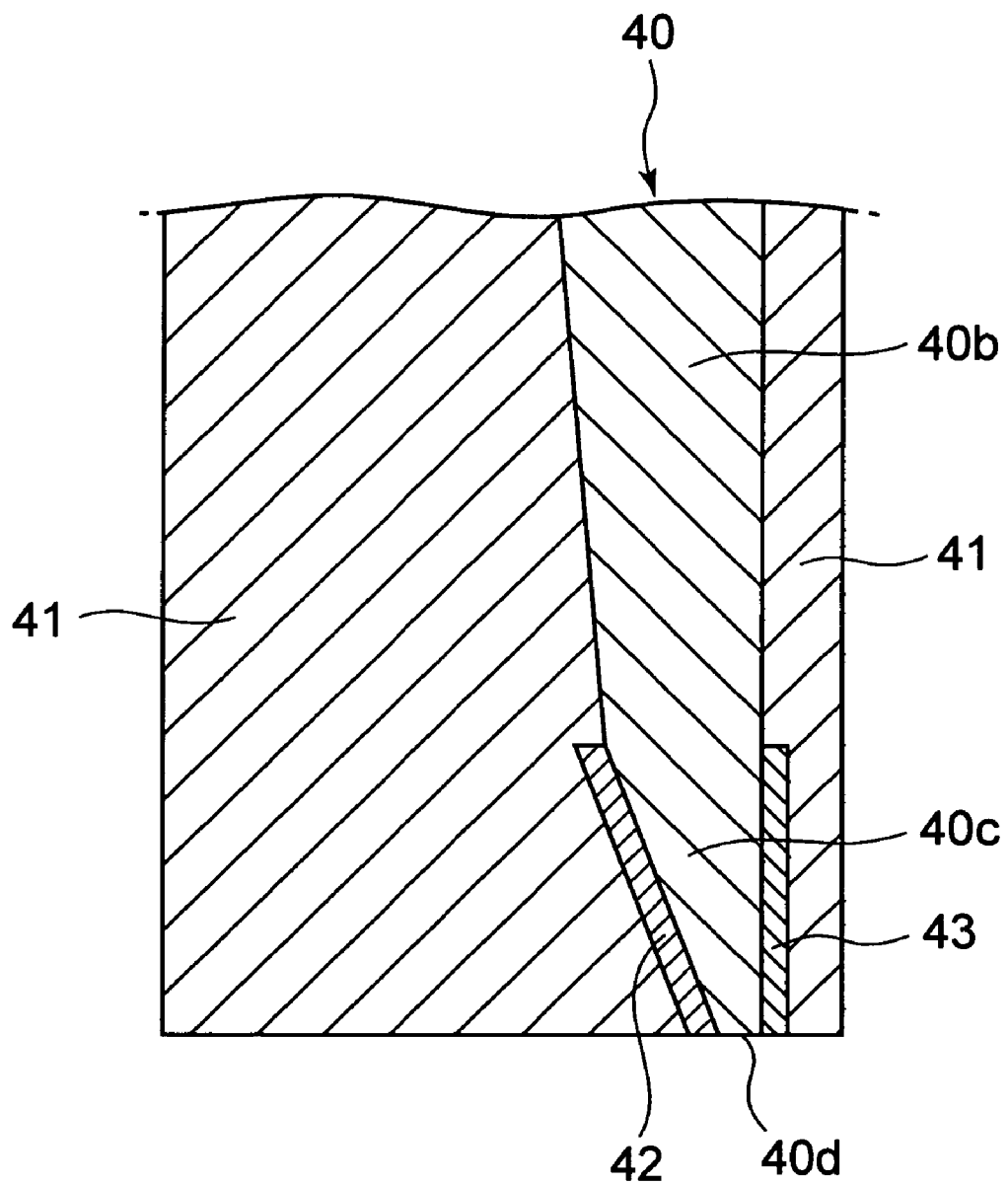
FIG. 14 is a drawing of a modification of the near field light generating element according to the present invention, and is a cross-sectional view showing the near field light generating element in which the light-shielding film is formed on every side surfaces of the near field light generating unit, and one of the light-shielding films is a metallic film.
Figure 15:
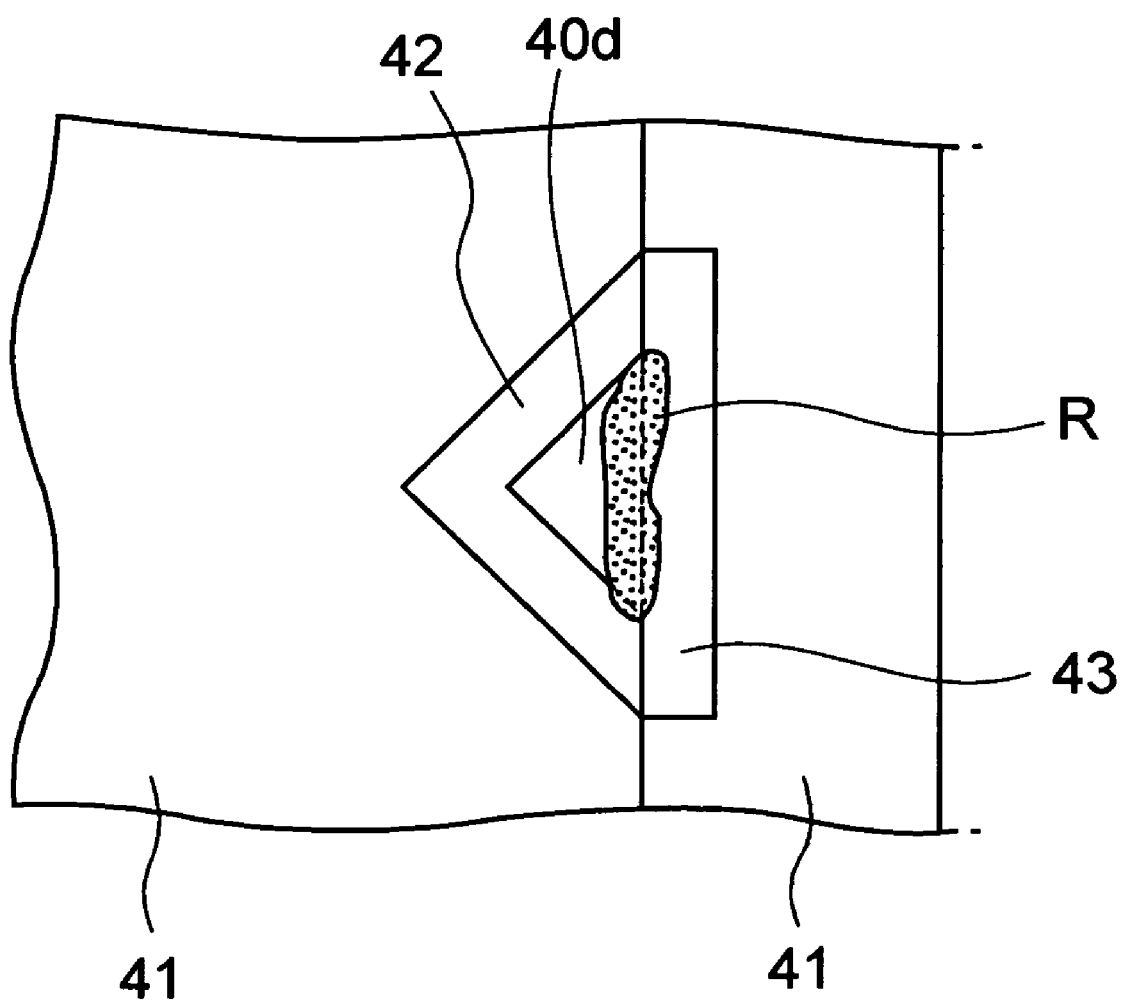
FIG. 15 is a drawing of the near field light generating element shown in FIG. 14 viewed from the side of the end surface.

Furthermore, it is also possible to employ a metallic film 43 which enhances the light intensity of the near field light R as the light-shielding film 42 formed on any one of side surfaces. For example, as shown in FIG. 14 and FIG. 15, it is also possible to employ the metallic film 43 which enhances the light intensity of the near field light R as the light-shielding film formed on the side surface opposing the main magnetic pole 32. In this configuration, the near field light R with a stronger light intensity may be generated. In other words, the luminous flux L condensed by the luminous flux condensing unit 40b enters the metallic film 43 in the near field light generating unit 40c. Then, the surface plasmon is excited in the metallic film 43. The excited surface plasmon is propagated along an interface between the metallic film 43 and the core 40 toward the end surface 40d while being increased in intensity by a resonance effect. Then, when it reaches the end surface 40d, it leaks as the near field light R having a strong light intensity. Therefore, the recording at the higher density is achieved.

In particular, since the near field light R having the strong light intensity is generated in the interface between the metallic film 43 and the core 40, direct influence of the design size of the end surface 40d is avoided. In other words, generation of the near field light R having the strong light intensity is ensured without being affected by physical designs even when a measure such as miniaturization of the size of the end surface 40d is not taken.

The metallic film 43 as described above may be, for example, a gold film, a silver film, a platinum film, or the like. From among these films, it is preferable to use the gold film from a point of being oxidation-resistant and being superior in durability. It is also possible to employ the metallic films 43 for all the light-shielding films.

Figure 16:
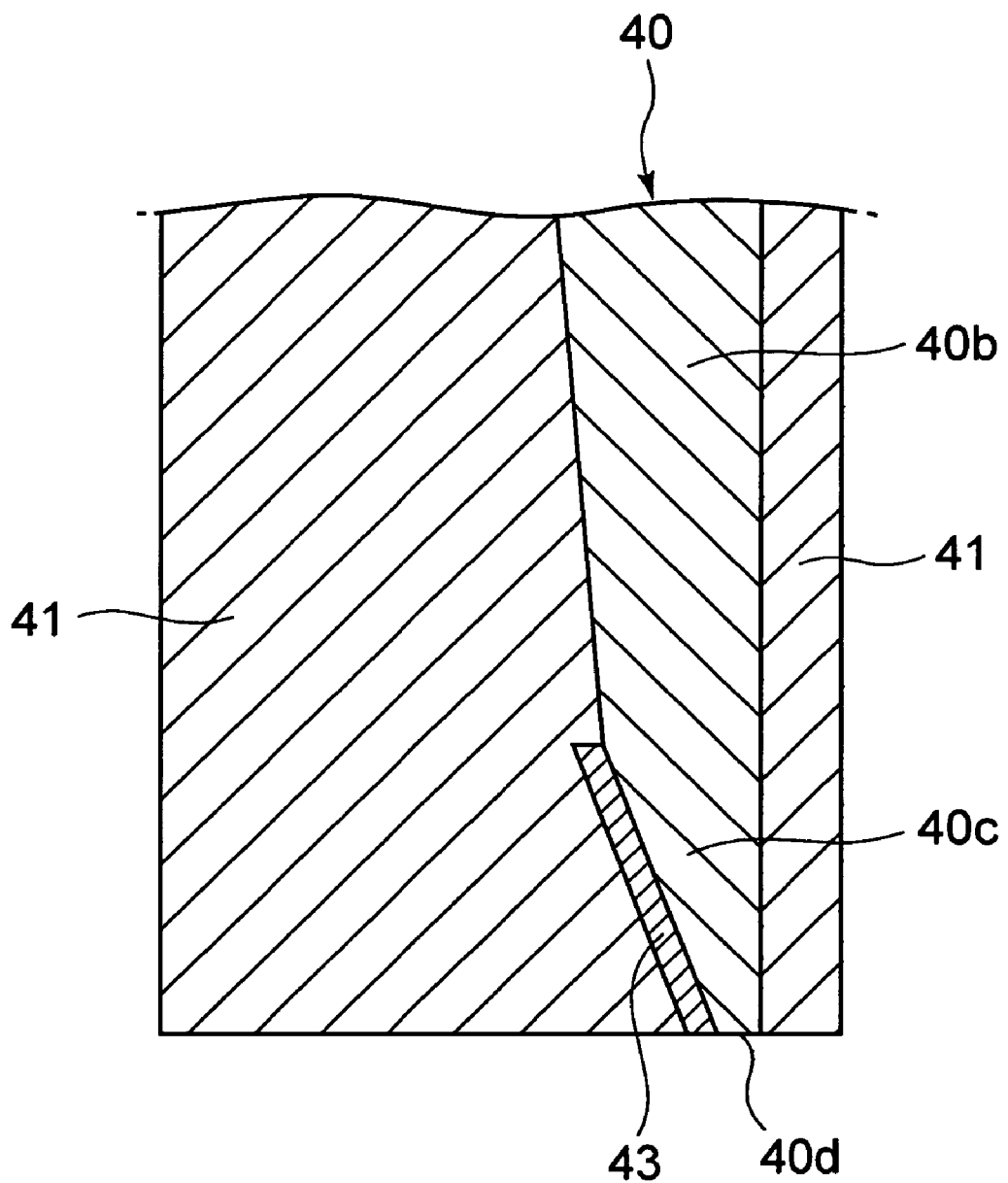
FIG. 16 is a drawing of a modification of the near field light generating element according to the present invention, and is a cross-sectional view showing the near field light generating element in which the metallic film is formed on one of the side surfaces of the near field light generating unit.
Figure 17:
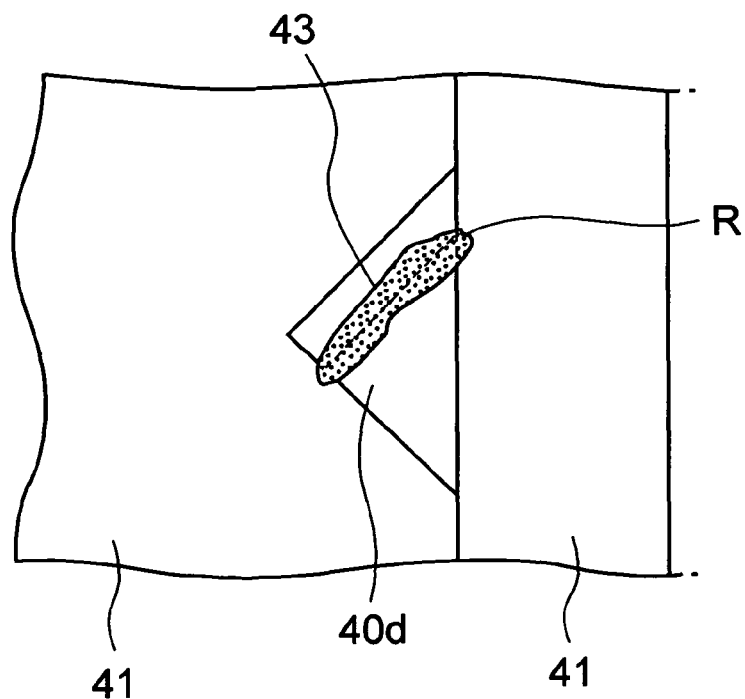
FIG. 17 is a drawing of the near field light generating element shown in FIG. 16 viewed from the side of the end surface.

In addition, it is also possible to form the metallic film 43 only on one or two side surfaces from among the three side surfaces of the near field light generating unit 40c. For example, as shown in FIG. 16 and FIG. 17, it is possible to form the metallic film 43 on one of the side surfaces from among the three side surfaces of the near field light generating unit 40c other than the side surface opposing the main magnetic pole 32. In this case as well, the near field light R at a strong light intensity may be generated in a state of being localized on the interface between the metallic film 43 and the core 40 without being affected by the physical design. Therefore, the recording at the higher density is achieved.

In particular, since the metallic film 43 is formed only one side surface of the three side surfaces of the near field light generating unit 40c, it is easy to form in comparison with the case of forming on the two or three side surfaces.

Figure 18:
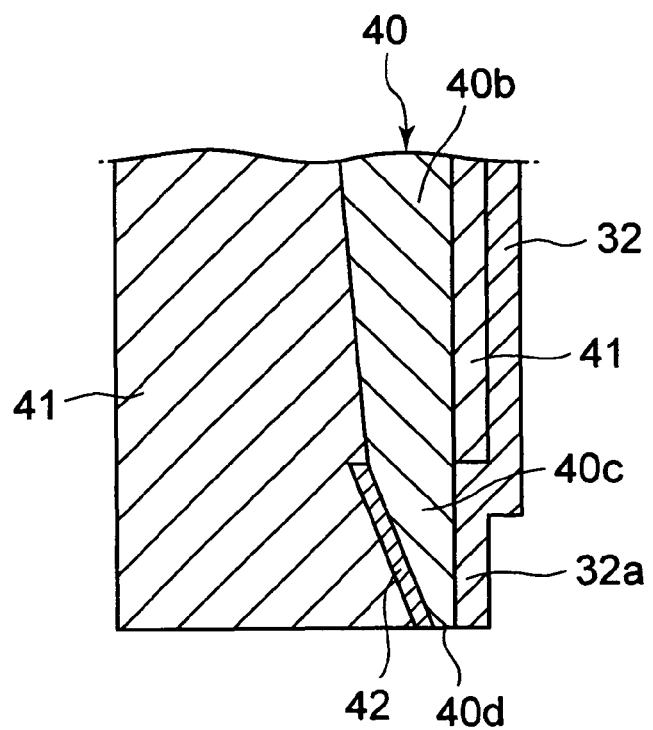
FIG. 18 is a drawing of a modification of the near field optical head according to the present invention, and is a partly enlarged view showing the near field optical head having a main magnetic pole coming into contact with the side surface of the near field light generating unit.
Figure 19:
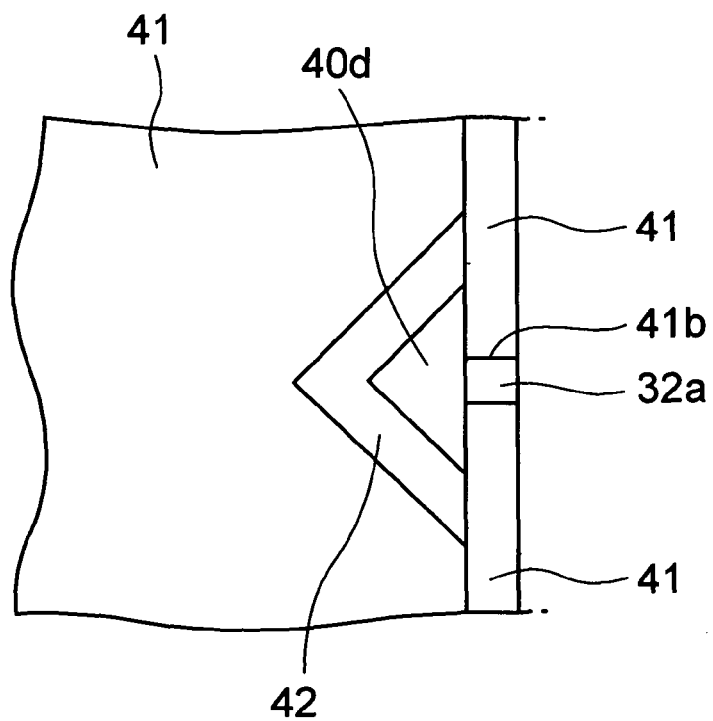
FIG. 19 is a drawing of the near field optical head shown in FIG. 18 viewed from the side of the end surface.

In the embodiment described above, as shown in FIG. 18 and FIG. 19, it is possible to form a groove portion 41b for exposing the side surface of the near field light generating unit 40c on the clad 41 and provide a projecting portion 32a which comes into contact with the side surface of the near field light generating unit 40c via the groove portion 41b on the main magnetic pole 32.

In this configuration, the position where the near field light R is generated and the position where the recording magnetic field is generated may be approached as close as possible. Therefore, the near field light R and the recording magnetic field may be brought into cooperation with a higher degree of efficiency, so that the high density recording is supported.

Figure 20:
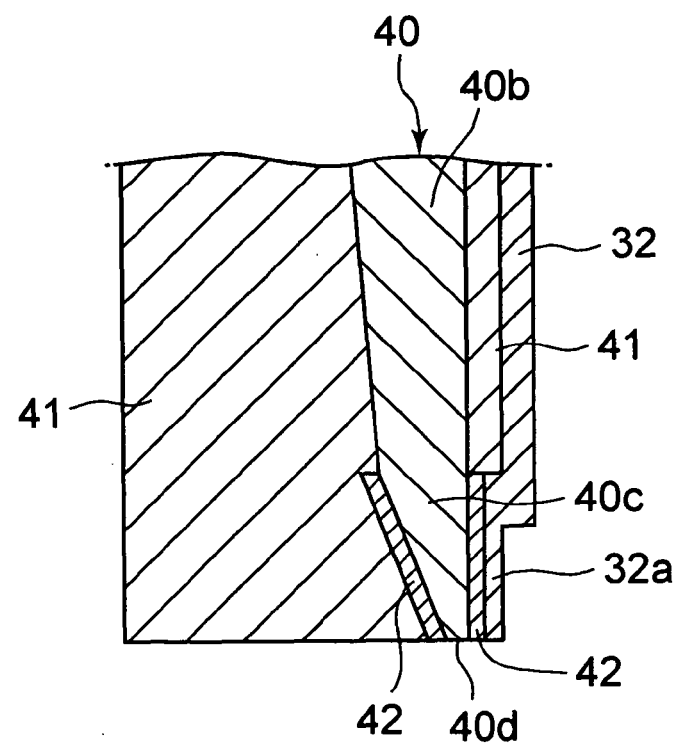
FIG. 20 is a drawing of a modification of the near field optical head according to the present invention, and is a partly enlarged view showing the near field optical head in which a light-shielding film is formed between the main magnetic pole and the side surface of the near field light generating unit shown in FIG. 18.
Figure 21:
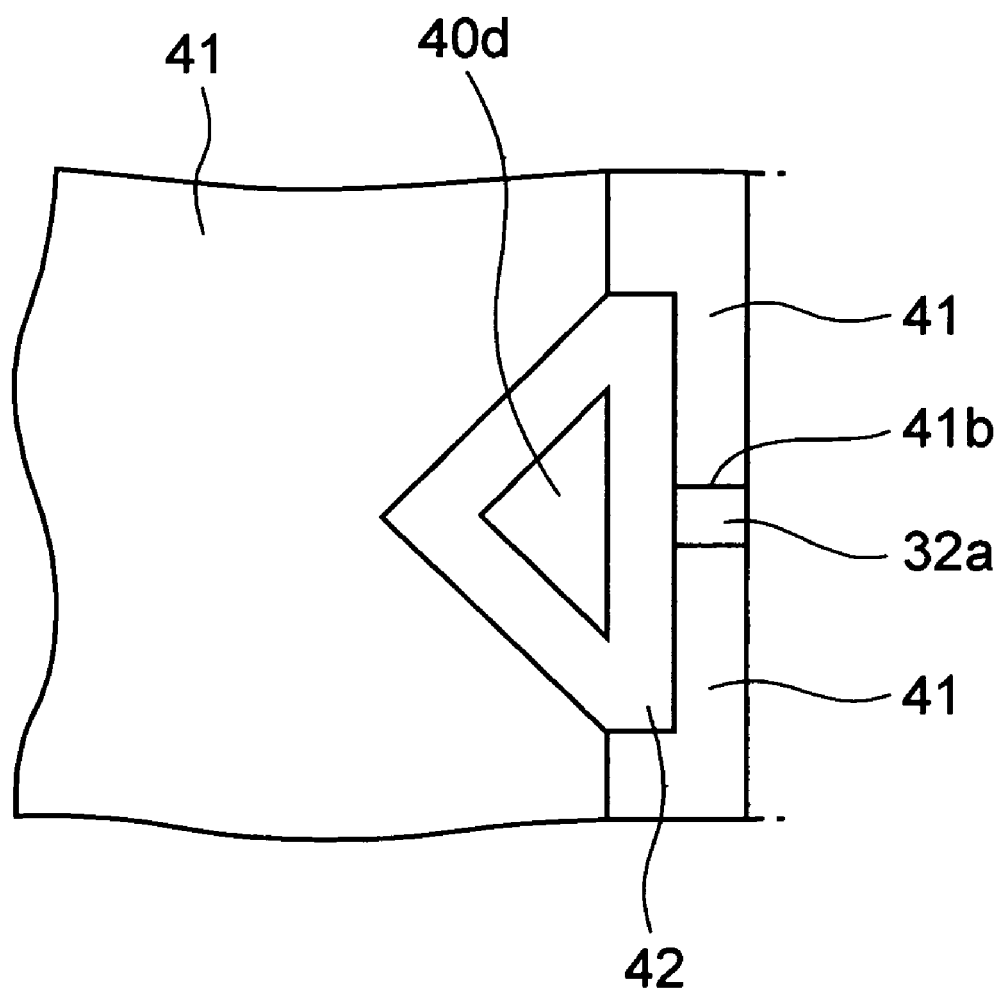
FIG. 21 is a drawing of the near field optical head shown in FIG. 20 viewed from the side of the end surface.

In particular, when providing the projecting portion 32a, as shown in FIG. 20 and FIG. 21, it is more preferable to form the light-shielding film 42 between the projecting portion 32a and the side surface of the near field light generating unit 40c. In this configuration, since the near field light R is generated in the vicinity of the projecting portion 32a more intensively, the recording at the higher density is achieved.

Figure 22:
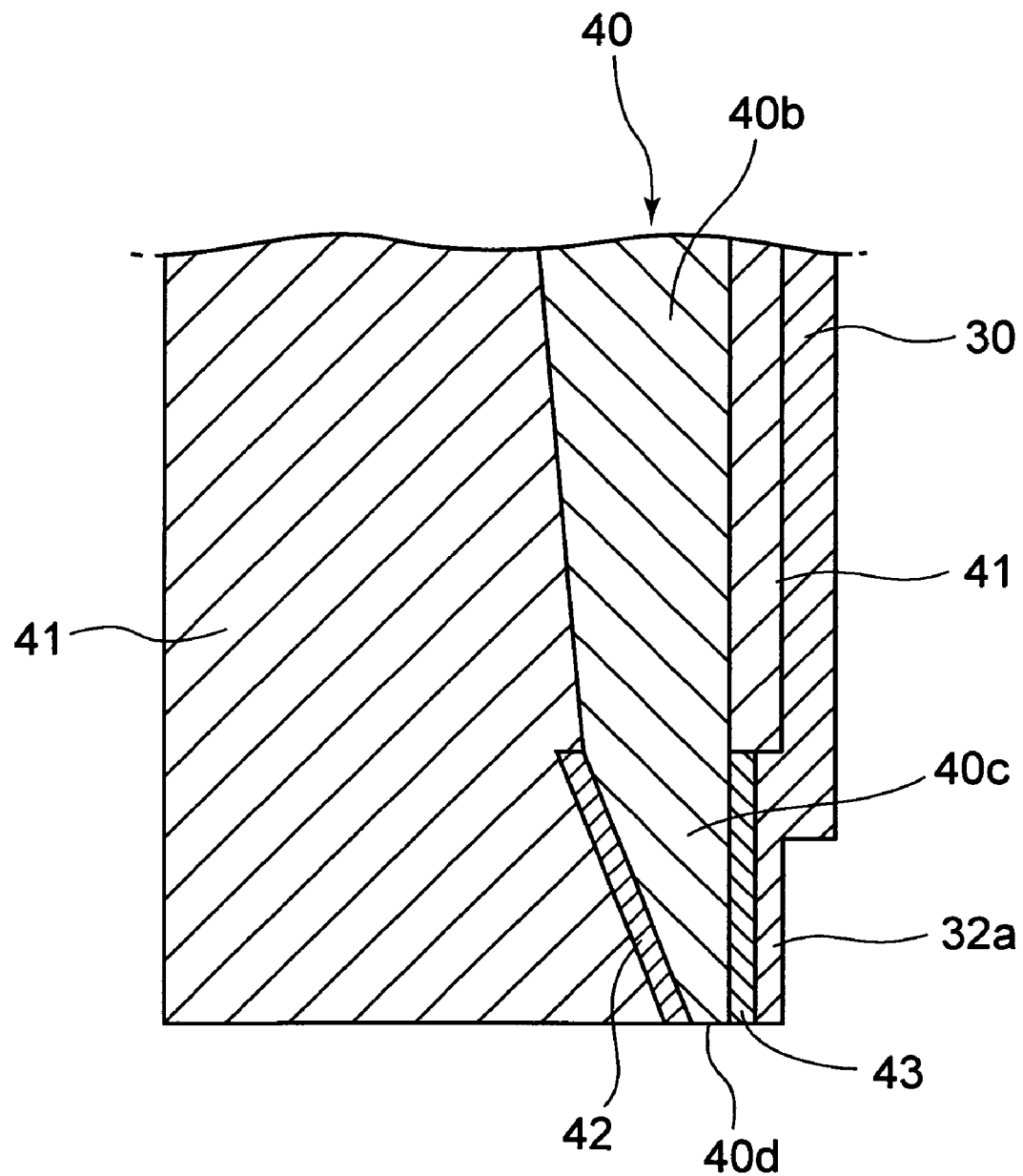
FIG. 22 is a drawing of a modification of the near field optical head according to the present invention, and is a partly enlarged view showing the near field optical head in which the light-shielding film shown in FIG. 20 is a metallic film.
Figure 23:
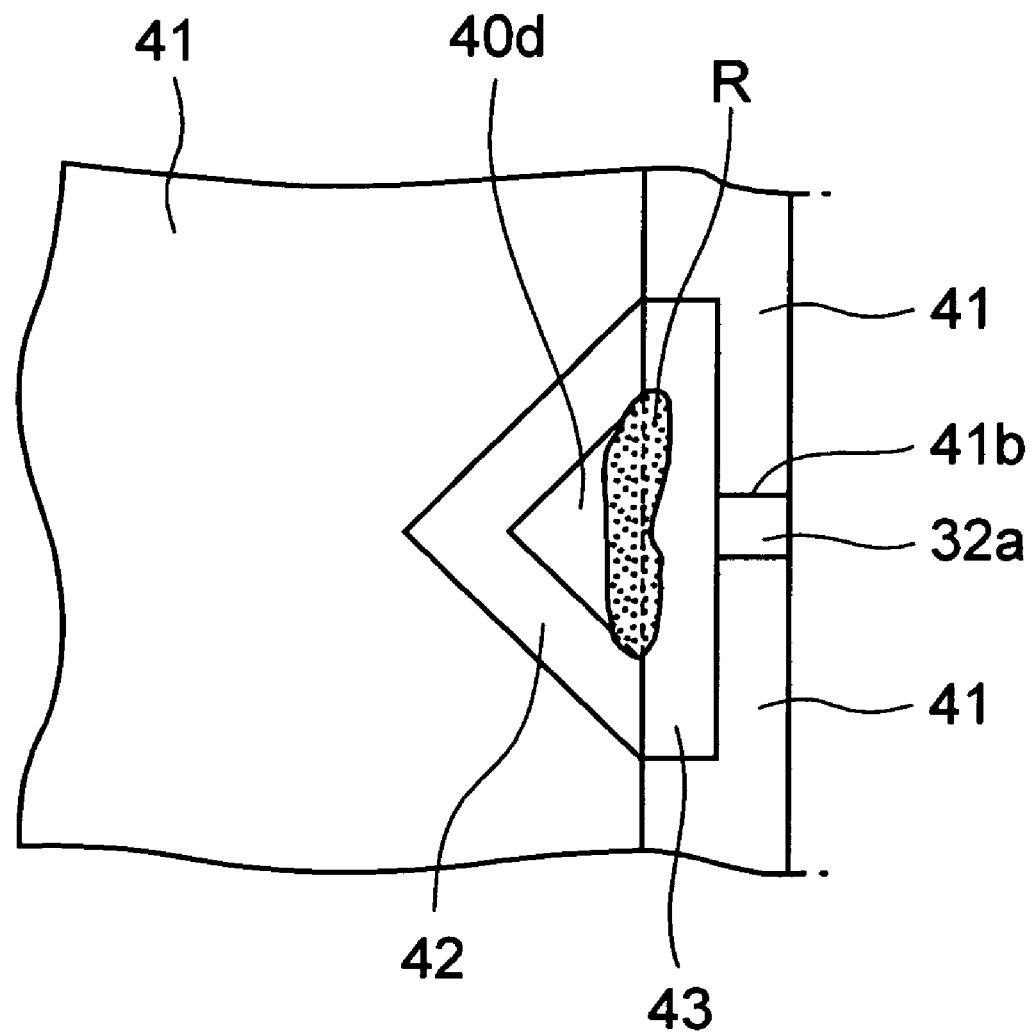
FIG. 23 is a drawing of the near field optical head shown in FIG. 22 viewed from the side of the end surface.

Furthermore, when providing the projecting portion 32a, as shown in FIG. 22 and FIG. 23, it is preferable to employ the metallic film 43 as the light-shielding film formed on the side surface opposing the main magnetic pole 32 from among the three side surfaces of the near field light generating unit 40c as in the case shown in FIG. 14 and FIG. 15. In this configuration, the near field light R with a strong light intensity may be generated in a state of being localized at a position nearer to the projecting portion 32a. Therefore, the near field light R and the recording magnetic field may be brought into cooperation with a higher degree of efficiency, so that the recording at the higher density is achieved.

Additionally, when providing the metallic film 43 as shown in FIG. 22 and FIG. 23, the near field light R may be generated with an even stronger light intensity and with a higher degree of efficiency.

Figure 24:
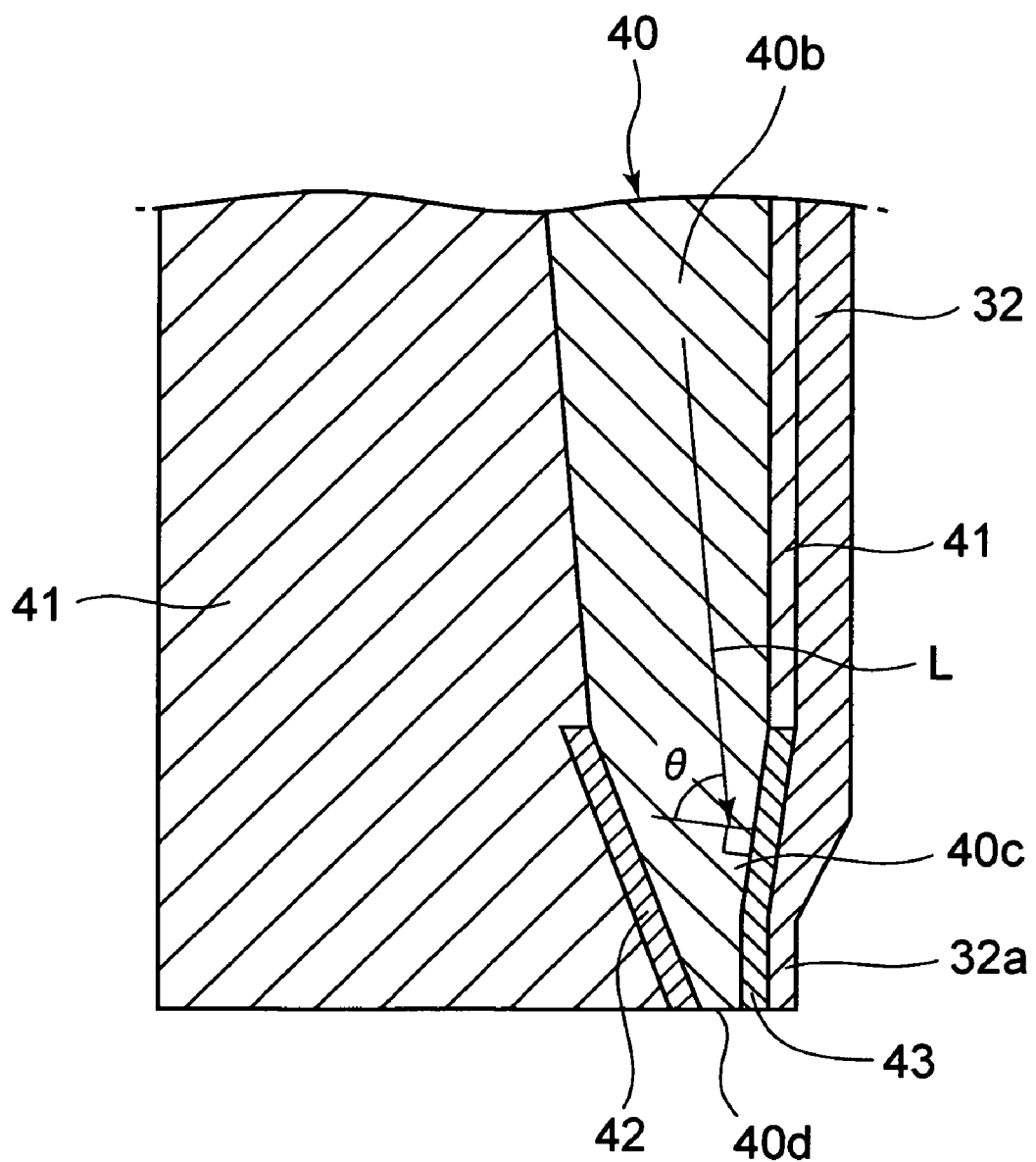
FIG. 24 is a drawing of a modification of the near field optical head according to the present invention, and is a partly enlarged view showing the near field optical head in which the side surface of the near field light generating unit on which the metallic film is formed shown in FIG. 22 is adjusted in angle.
Figure 25:
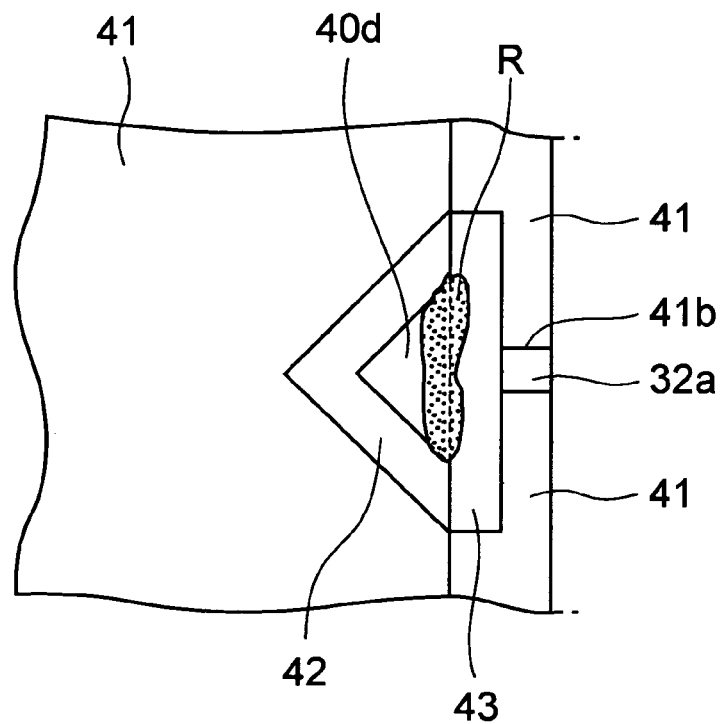
FIG. 25 is a drawing of the near field optical head shown in FIG. 24 viewed from the side of the end surface.

For example, it is recommended to adjust the angle of the side surface of the near field light generating unit 40c formed with the metallic film 43 as shown in FIG. 24 and FIG. 25 so as to cause the luminous flux L condensed by the luminous flux condensing unit 40b to enter the metallic film 43 at a resonant angle θ and excite the surface plasmon on the surface of the metallic film 43 with the energy of the luminous flux L.

Here, the incident angle and the intensity of the reflected light of the luminous flux L will be briefly described.

Figure 26:
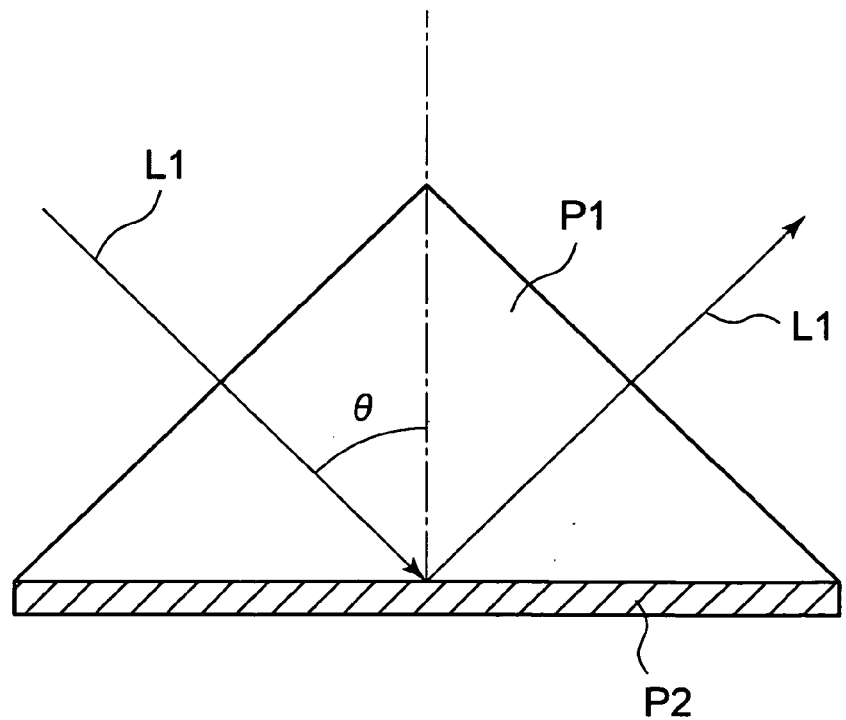
FIG. 26 is a drawing for explaining the relation between an incident angle of a light which excites a surface plasmon and the intensity of a reflected light.

As shown in FIG. 26, when a light L1 is entered toward a prism P1 provided with a metallic film P2 on a bottom surface thereof on the condition of total reflection, the intensity of the reflected light varies according to an incident angle θ (an angle formed between a straight line vertical to the surface of the metallic film P2 and the light L1). It is because the energy of the light L1 is utilizing for the excitation of the surface plasmon. Then, when the incident angle is varied and the intensity of the reflected light is detected, there exists an incident angle at which the intensity of the reflected light exhibits a minimum value. It is because the energy of the light L1 is utilizing for the excitation of the surface plasmon to the maximum. Therefore, the incident angle which provides the minimum intensity of the reflected light is generally referred to as a resonant angle.

Therefore, as shown in FIG. 24, by causing the luminous flux L condensed by the luminous flux condensing unit 40b to enter the metallic film 43 at a resonant angle θ, the surface plasmon may be excited with a highest degree of efficiency, and the near field light R at a further stronger light intensity may be generated with a higher degree of efficiency.

The luminous flux L introduced into the core 40 is gradually condensed while repeating the reflection on the side surfaces of the core 40 and proceeds to the end surface 40d, and in the stage of being proceeded to the luminous flux condensing unit 40b, it is condensed to some extent, and hence the direction of travel is fixed. In other words, it is possible to grasp how the main component of the luminous flux L proceeds and propagates in the core 40 at the time point when the core 40 is designed. Therefore, as shown in FIG. 24, the angle of the side surface of the near field light generating unit 40c may be adjusted to cause the main component of the luminous flux L to enter the metallic film 43 at the resonant angle θ.

Figure 27:
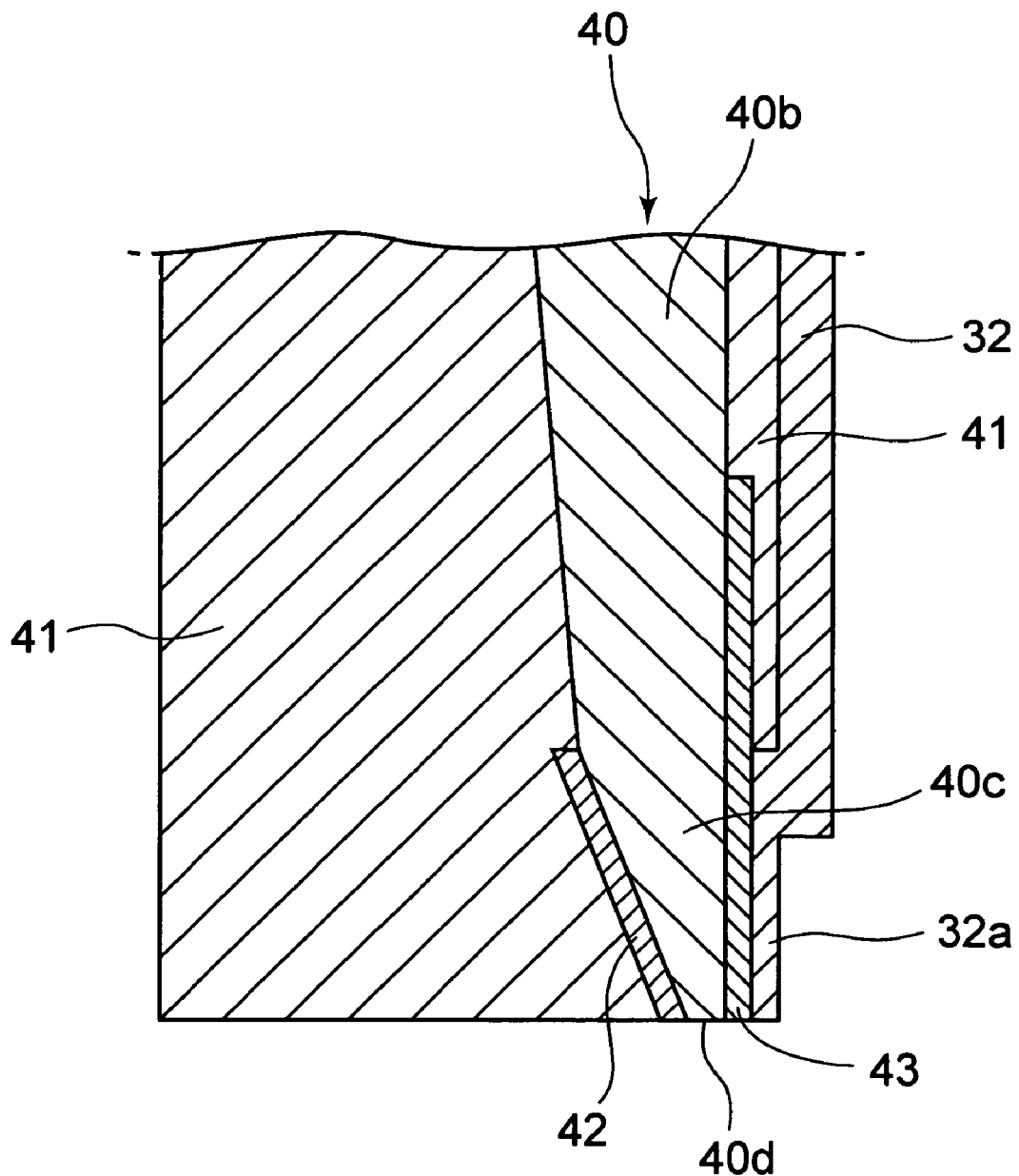
FIG. 27 is a drawing of a modification of the near field optical head according to the present invention, and is a partly enlarged view showing the near field optical head in which part of the metallic film shown in FIG. 22 is overlapped with the clad.
Figure 28:
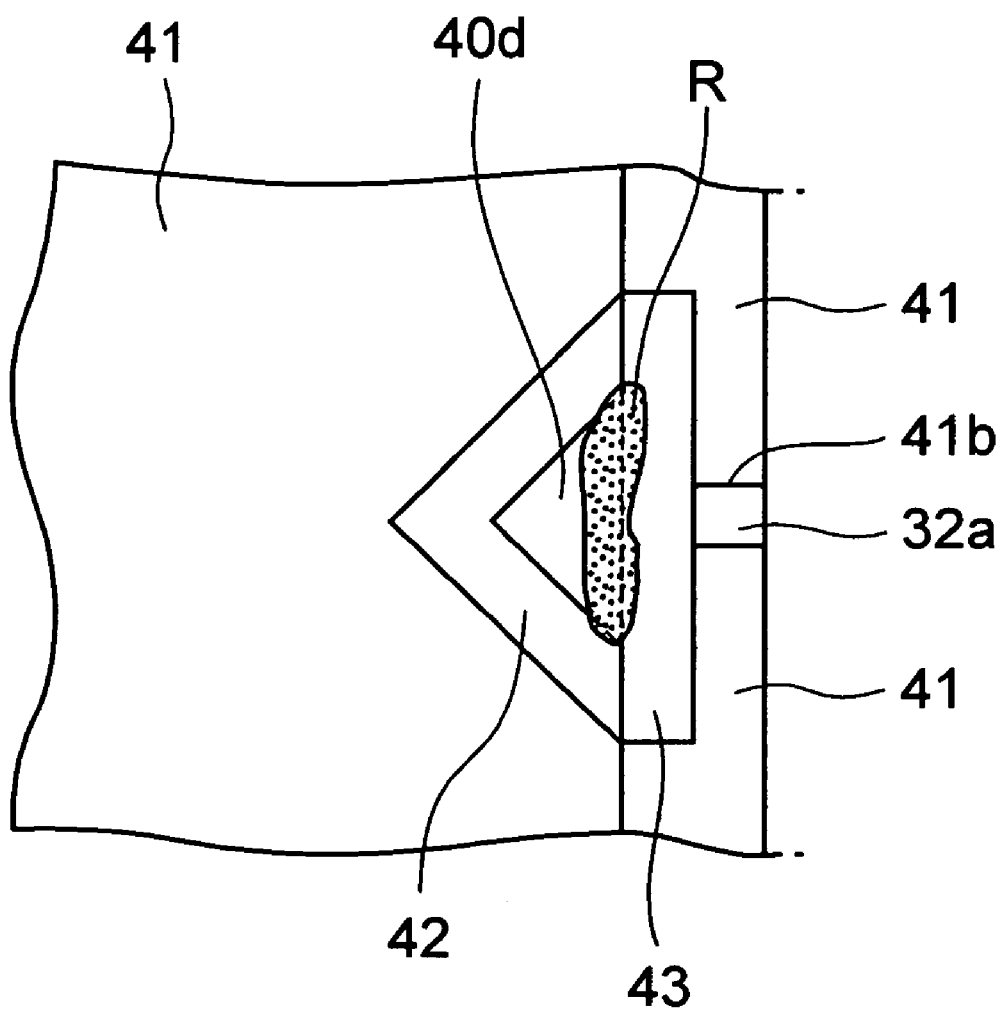
FIG. 28 is a drawing of the near field optical head shown in FIG. 27 viewed from the side of the end surface.

When causing the condensed luminous flux L to enter the metallic film 43 at the resonant angle θ, it is recommended to design in such a manner that part of the metallic film 43 is overlapped with the clad 41 as shown in FIG. 27 an FIG. 28. As described above, it is known that the surface plasmon may be excited with a high degree of efficiency by causing the luminous flux L to enter the metallic film 43 at the resonant angle θ, and it is also generally known that the resonant angle θ varies only by causing a dielectric thin film to be adsorbed on the metallic film P2 of the prism P1. Therefore, as shown in FIG. 27, the resonant angle θ may be adjusted to a given angle by overlapping the metallic film 43 partly with the clad 41. Therefore, even in the case shown in FIG. 27, it is possible to cause the condensed luminous flux L to enter the metallic film 43 at the resonant angle θ, and the near field light R at a further stronger light intensity may be generated with a higher degree of efficiency.

In particular, even when the angle of the side surface of the near field light generating unit 40c is difficult to adjust mechanically, since the resonant angle θ by itself may be varied, so that the mechanical design is assisted thereby. Therefore, improvement of the design flexibility is achieved.

Figure 29:
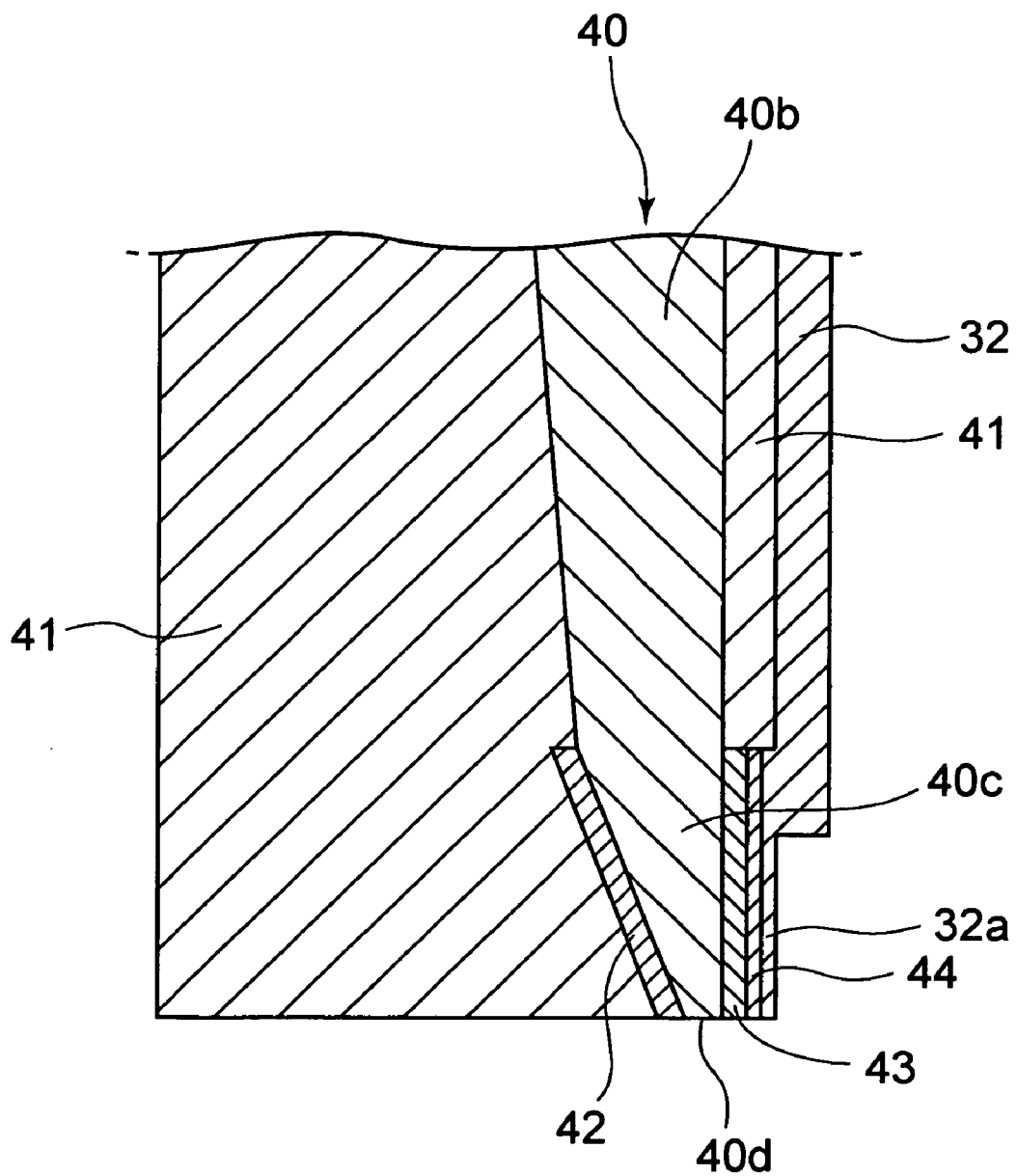
FIG. 29 is a drawing of a modification of the near field optical head according to the present invention, and is a partly enlarged view showing the near field optical head in which a shield film is formed between the metallic film and a projecting portion shown in FIG. 22.
Figure 30:
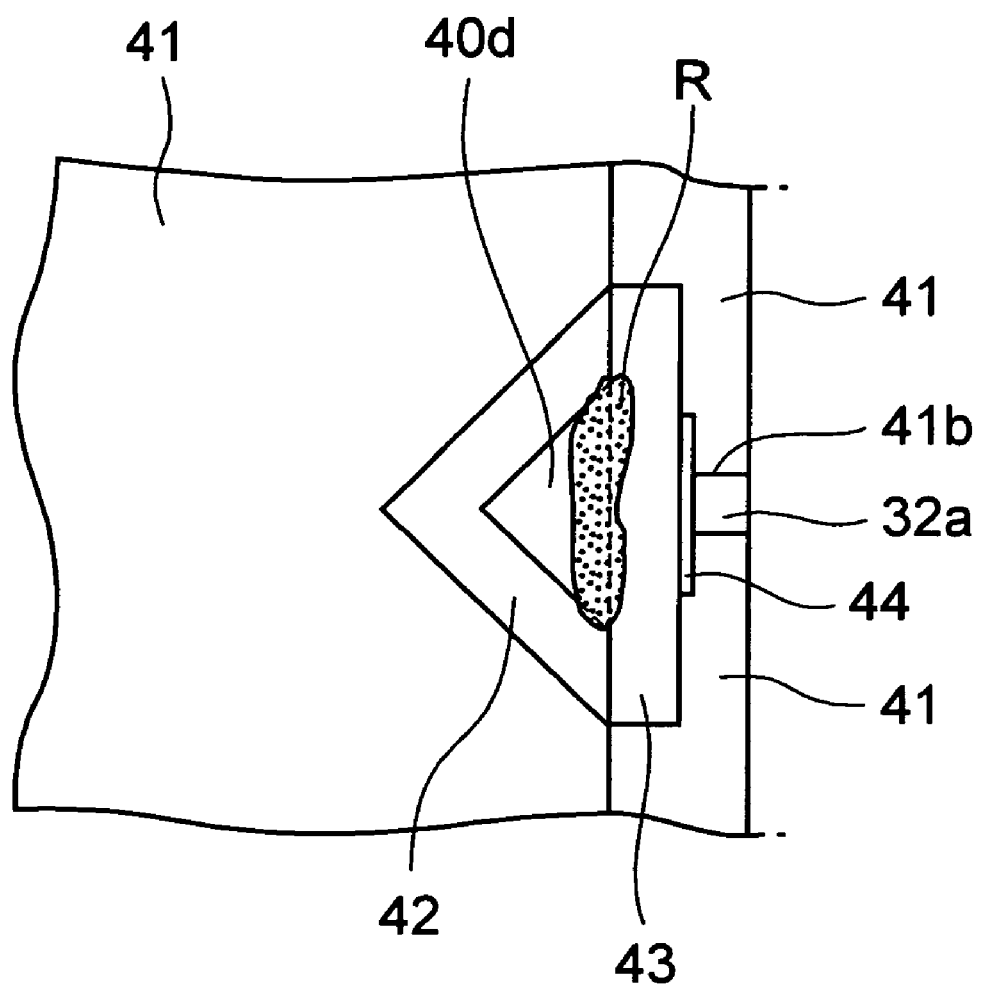
FIG. 30 is a drawing of the near field optical head shown in FIG. 29 viewed from the side of the end surface.

As shown in FIG. 22 and FIG. 23, when the metallic film 43 is provided, a shield film 44 shown in FIG. 29 and FIG. 30 may be provided between the metallic film 43 and the projecting portion 32a. The shield film 44 serves to shield at least one of the electrical connection and the magnetic connection between the projecting portion 42a and the metallic film 43. In this configuration, the information recording is achieved by the near field light assisted magnetic recording system in which the near field light R and the recording magnetic field are cooperated further effectively.

Although the case where the information recording and reproducing apparatus 1 of the air floating type in which the near field optical head 2 is floated is exemplified in the respective embodiments described above, the invention is not limited to this case, and the disc D and the slider 20 may be in contact with each other as long as it is arranged so as to oppose the disc surface D1. In other words, the near field optical head 2 according to the present invention may be a head of a contact slider type. In this case as well, the same effects and advantages may be achieved.

According to the near field light generating element in the present invention, the luminous flux introduced from the one end side of the core may be converted into the near field light with a high degree of efficiency, and this near field light may be emitted from the other end side to the outside. In particular, since the near field light may be generated with a high degree of efficiency irrespective of the direction of introduction of the luminous flux, easy handling and superior convenience are achieved. Therefore, the near field light generating element may be used easily in various devices which needs the near field light, so that the design flexibility may be improved.

According to the near field optical head in the present invention, since the near field light generating element as described above is provided, the writing reliability is high, and the high quality is achieved. Also, since the luminous flux introducing means may be arranged without being affected by the direction of introduction of the luminous flux, the design may be downsized. In addition, since the luminous flux does not have to be propagated in air in contrast to the method of introducing the light in the related art, a optical waveguide loss may be minimized. Also, since the overlapping of the respective components other than the luminous flux introducing means in the thickness direction is prevented as much as possible, reduction of the thickness is achieved.

According to the information recording and reproducing apparatus in the present invention, since the near field optical head as described above is provided, the writing reliability is high, and the high density recording is supported, whereby the high quality is achieved. Simultaneously, reduction of the thickness is also achieved.

The invention claimed is:

1. A near field light generating element configured to propagate a luminous flux in the form of light introduced on one end side while condensing the luminous flux on the other end side in a direction different from the direction of introduction, to generate near field light, and to emit the near field light to an outside, the near field light generating element comprising:

a polyhedron core comprising a reflecting surface configured to reflect the introduced luminous flux to a direction different from the direction of introduction; a luminous flux condensing unit which is narrow-molded into such a shape that a cross-sectional area orthogonal to a longitudinal direction extending from the one end side toward the other end side is gradually reduced for propagating the reflected luminous flux toward the other end side while condensing the luminous flux; and a near field light generating unit which is further narrow-molded from an end portion of the luminous flux condensing unit to the other end side for generating near field light from the condensed luminous flux and emitting the near field light from the other end side toward the outside, an end surface of the near field light generating unit being exposed to the outside on the other end side and having a size not exceeding the wavelength of the light, and at least one of side surfaces of the near field light generating unit being shielded by a light-shielding film; and a clad formed of a material having a lower index of refraction than that of the core and configured to confine the core in the interior thereof by coming into tight contact with a side surface of the core while exposing the other end side of the core to the outside.

2. A near field light generating element according to claim 1; wherein the clad is formed so as to cover the core in a state in which one end side of the core is exposed to the outside.

3. A near field light generating element according to claim 1; wherein the near field light generating unit is formed straight so as to have a predetermined length on the other end side which is the same length as the end surface.

4. A near field light generating element according to claim 1; wherein each of the side surfaces of the near field light generating unit is shielded by the light-shielding film.

5. A near field light generating element according to claim 1; wherein the light-shielding film is a metallic film which increases the light intensity of the near field light.

6. A near field light generating element according to claim 5; wherein the side surface of the near field light generating unit provided with the metallic film is adjusted in angle so that the luminous flux condensed by the luminous flux condensing unit enters the metallic film at a resonant angle and a surface plasmon is excited with the energy of the luminous flux.

7. A near field optical head configured to record information by heating a magnetic recording medium which rotates in a constant direction and causing a magnetization reversal by providing a recording magnetic field in the vertical direction with respect to the magnetic recording medium, the near field optical head comprising:

a slider arranged so as to oppose a surface of the magnetic recording medium;

an auxiliary magnetic pole fixed to a distal end surface of the slider;

a main magnetic pole connected to the auxiliary magnetic pole via a magnetic circuit and generating the recording magnetic field between itself and the auxiliary magnetic pole;

a coil wound around the magnetic circuit in a helical pattern and configured to receive a supply of an electric current modulated according to the information to be recorded;

a near field light generating element according to claim 1 fixed adjacently to the main magnetic pole in a state in which the other end side is directed toward the magnetic recording medium, the near field light generating unit generating the near field light in the vicinity of the main magnetic pole; and luminous flux introducing means fixed to the slider in a state of being arranged in parallel to the slider for introducing the luminous flux into the core of the near field light generating element from the one end side.

8. A near field optical head according to claim 7; wherein the clad is formed with a groove portion which exposes a side surface of the near field light generating unit, and the main magnetic pole includes a projecting portion which comes into contact with the side surface of the near field light generating unit via the groove portion.

9. A near field optical head according to claim 8; wherein the light-shielding film is formed between the projecting portion and the side surface of the near field light generating unit.

10. A near field optical head according to claim 9; further comprising a shield film formed between the projecting portion and the light-shielding film for shielding at least one of an electric connection or a magnetic connection between the projecting portion and the light-shielding film.

11. An information recording and reproducing apparatus comprising:

a near field optical head according to claim 7;

a beam configured to be movable in a direction parallel to a surface of the magnetic recording medium and to support the near field optical head at a distal end side in a state of being rotatable about two axes extending in parallel to the surface of the magnetic recording medium and being orthogonal to each other;

a light source configured to introduce the luminous flux to the luminous flux introducing means;

an actuator configured to support a proximal end side of the beam and move the beam toward the direction parallel to the surface of the magnetic recording medium;

a rotation driving unit configured to rotate the magnetic recording medium in the constant direction; and a control unit configured to supply the electric current to the coil and control an operation of the light source.

* * * * *